United States Patent
Koyama et al.

(10) Patent No.: US 9,434,644 B2
(45) Date of Patent: Sep. 6, 2016

(54) COVER GLASS AND METHOD FOR PRODUCING COVER GLASS

(75) Inventors: Akihiro Koyama, Takarazuka (JP); Mikiko Morishita, Pyeongtaek-si (KR); Satoshi Ami, Yokkaichi (JP); Kazuaki Hashimoto, Akiruno (JP); Tetsuo Takano, Tachikawa (JP)

(73) Assignees: AVANSTRATE INC., Mie (JP); HOYA CORPORATION, Tokyo (JP)

( * ) Notice: Subject to any disclaimer, the term of this patent is extended or adjusted under 35 U.S.C. 154(b) by 428 days.

(21) Appl. No.: 13/247,627

(22) Filed: Sep. 28, 2011

(65) Prior Publication Data

US 2012/0083401 A1    Apr. 5, 2012

(30) Foreign Application Priority Data

Sep. 30, 2010 (JP) .................................. 2010-222826
Dec. 29, 2010 (JP) .................................. 2010-294557

(51) Int. Cl.

| | |
|---|---|
| *C03C 3/085* | (2006.01) |
| *C03C 3/091* | (2006.01) |
| *C03C 3/093* | (2006.01) |
| *C03C 21/00* | (2006.01) |
| *C03C 3/087* | (2006.01) |
| *C03C 15/00* | (2006.01) |
| *C03C 3/083* | (2006.01) |
| *C03C 15/02* | (2006.01) |

(52) U.S. Cl.
CPC ............ *C03C 21/002* (2013.01); *C03C 3/083* (2013.01); *C03C 3/085* (2013.01); *C03C 3/087* (2013.01); *C03C 15/00* (2013.01); *C03C 15/02* (2013.01)

(58) Field of Classification Search
None
See application file for complete search history.

(56) References Cited

U.S. PATENT DOCUMENTS 3,752,729 A * 8/1973 Mochel .................. C03C 3/078
                                                          428/218
4,397,669 A * 8/1983 Haisma ................. C03B 11/084
                                                          65/103

(Continued)

FOREIGN PATENT DOCUMENTS

CN          1620245 A       5/2005
CN        101454252 A       6/2009

(Continued)

OTHER PUBLICATIONS

Japanese Office Action of the corresponding Japanese patent application No. 2011-215679, dated May 21, 2013.

(Continued)

*Primary Examiner* — David Sample
(74) *Attorney, Agent, or Firm* — Global IP Counselors, LLP

(57) ABSTRACT

The disclosed cover glass is produced by etching a glass substrate that has been formed by a down-drawing process, and chemically strengthening the glass substrate to provide the glass substrate with a compressive-stress layer on the principal surfaces thereof. The glass substrate contains, as components thereof, 50% to 70% by mass of $SiO_2$, 5% to 20% by mass of $Al_2O_3$, 6% to 30% by mass of $Na_2O$, and 0% to less than 8% by mass of $Li_2O$. The glass substrate may also contain 0% to 2.6% by mass of CaO, if necessary. The glass substrate has an etching characteristic in which the etching rate is at least 3.7 μm/minute in an etching environment having a temperature of 22° C. and containing hydrogen fluoride with a concentration of 10% by mass.

7 Claims, 5 Drawing Sheets

(56) References Cited

U.S. PATENT DOCUMENTS

| | | | |
|---|---|---|---|
| 6,089,099 A | 7/2000 | Sathe et al. | |
| 7,666,511 B2 | 2/2010 | Ellison et al. | |
| 7,687,420 B2 | 3/2010 | Murata | |
| 2005/0037278 A1 | 2/2005 | Koishikawa et al. | |
| 2008/0020919 A1 | 1/2008 | Murata | |
| 2009/0197088 A1 | 8/2009 | Murata | |
| 2009/0325776 A1 | 12/2009 | Murata | |
| 2010/0035745 A1 | 2/2010 | Murata | |
| 2010/0047521 A1* | 2/2010 | Amin et al. | 428/141 |
| 2010/0087307 A1 | 4/2010 | Murata et al. | |
| 2011/0003619 A1* | 1/2011 | Fujii | 455/566 |
| 2011/0014475 A1 | 1/2011 | Murata | |
| 2011/0017297 A1* | 1/2011 | Aitken et al. | 136/260 |
| 2011/0045961 A1* | 2/2011 | Dejneka et al. | 501/66 |
| 2011/0071012 A1* | 3/2011 | Kondo et al. | 501/71 |
| 2011/0274916 A1 | 11/2011 | Murata | |

FOREIGN PATENT DOCUMENTS

| | | | | |
|---|---|---|---|---|
| CN | 1017772470 A | | 7/2010 | |
| EP | 2233447 A1 | | 9/2010 | |
| GB | 1177248 A | * | 1/1970 | C03C 21/002 |
| JP | 2002-174810 A | | 6/2002 | |
| JP | 2007-099557 A | | 4/2007 | |
| JP | 2007-128054 A | | 5/2007 | |
| JP | 2008-1590 A | | 1/2008 | |
| JP | 2008-115071 A | | 5/2008 | |
| JP | 2008-115072 A | | 5/2008 | |
| JP | 2008-195602 A | | 8/2008 | |
| JP | 2009-13052 A | | 1/2009 | |
| JP | 2009-057271 A | | 3/2009 | |
| JP | 2009-84076 A | | 4/2009 | |
| JP | 2009-167086 A | | 7/2009 | |
| JP | 2009-208983 A | | 9/2009 | |
| JP | 2009-227523 A | | 10/2009 | |
| JP | 2010-30876 A | | 2/2010 | |
| JP | 2010-059038 A | | 3/2010 | |
| JP | 2010-070445 A | | 4/2010 | |
| JP | 2010-116276 A | | 5/2010 | |
| JP | 2010-168233 A | | 8/2010 | |
| JP | 2010-180076 A | | 8/2010 | |
| JP | 2010-527892 A | | 8/2010 | |
| WO | WO-2009078406 A | * | 6/2009 | |

OTHER PUBLICATIONS

Japanese Office Action of the corresponding Japanese patent application No. 2011-215679, dated Oct. 22, 2013.

Chinese Office Action issued in Chinese Patent Application No. 201110293857.3 dated Dec. 3, 2014.

* cited by examiner

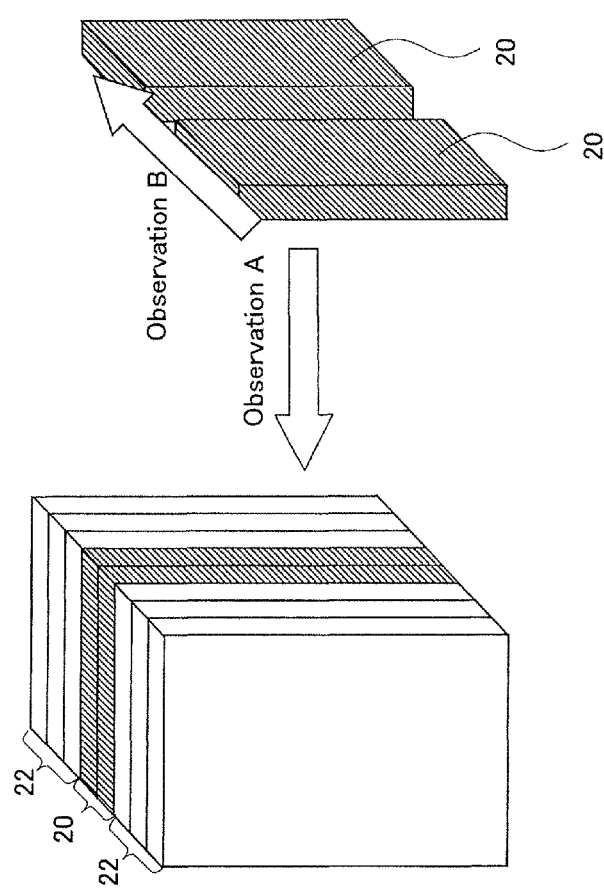

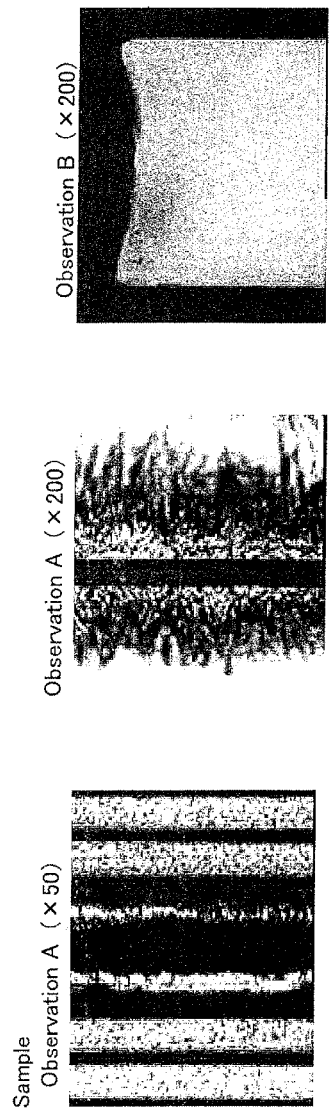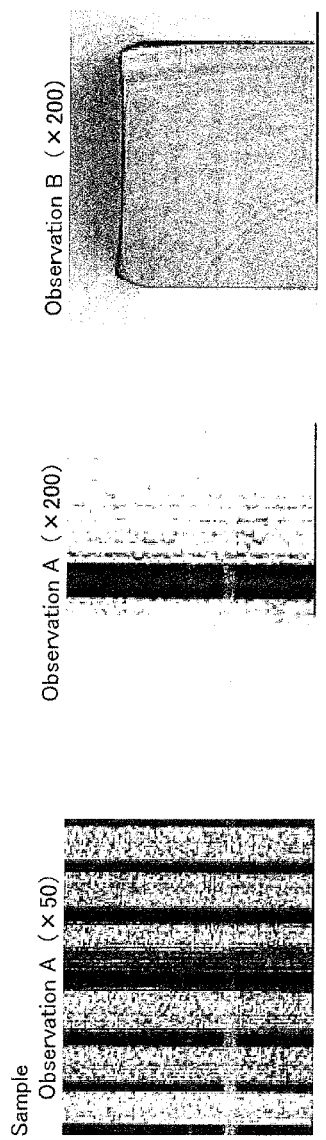

COVER GLASS AND METHOD FOR PRODUCING COVER GLASS

BACKGROUND OF THE INVENTION

1. Field of the Invention

The present invention relates to a cover glass that is subjected to shape-processing by etching and that is chemically-strengthened so as to have a compressive-stress layer on its principal surfaces, and to a method for producing the cover glass. The cover glass produced according to an embodiment of the present disclosure can be employed, for example, as a glass plate used as a component for protecting the display screen or the like of equipment such as a mobile phone, a personal digital assistant (PDA), a digital camera, or a flat panel display (FPD).

2. Background Art

Strengthened glasses produced by chemically strengthening glass substrates have been conventionally used, for example, as cover materials for protecting the liquid-crystal display screens etc. of equipment such as mobile phones, PDAs, digital cameras, and FPDs. The glass substrates are strengthened by an ion-exchange process.

In recent years, mobile phones and PDAs have tended to become thinner, more sophisticated in functionality, and more complicated in shape. Thus, strengthened glasses used as cover glasses in equipment such as mobile phones and PDAs are required to have formed therein recesses and/or holes with negative curvatures. Herein, what is meant by a negative curvature is that, if a point that is located on and moves along the contour of a given region keeps turning toward the right while the inner section of the region is always located on the left-hand side of the point, then the contour of said region is considered as having a negative curvature. On the other hand, the contour is considered as having a positive curvature if the point keeps turning toward the left as it moves along the contour while the inner section of the region is always located on the left-hand side of the point. The contour is considered as having zero curvature if the point keeps moving straight forward.

It is, however, difficult to subject a strengthened glass to outer-shape processing to form recesses or holes that include sections with negative curvatures, because the strengthened glass has a compressive-stress layer on its surface.

Meanwhile, JP-A-2009-167086 discloses a cover glass for mobile terminals that exhibits high strength even at a thin glass substrate and that can thus reduce the thickness of the device on which the cover glass is mounted.

The aforementioned cover glass is produced as follows. First, a resist pattern is formed on the principal surfaces of a plate-shaped glass substrate. Then, with the resist pattern serving as a mask, the glass substrate is etched with an etchant which consists of a mixed-acid aqueous solution containing hydrofluoric acid and at least one type of acid selected from sulfuric acid, nitric acid, hydrochloric acid, and hydrofluorosilicic acid, to thereby cut the glass substrate into a desired shape. Then, the etched glass substrate is subjected to chemical strengthening by an ion-exchange process.

With this method, it is possible to produce a cover glass having end surfaces that have a surface roughness of 10 nm or less in arithmetic mean roughness (Ra).

According to the aforementioned method, it is possible to produce a chemically-strengthened cover glass having complicated shapes with negative curvatures and/or through-holes by etching the plate-shaped glass substrate into predetermined shapes. In the above method, the processing time required for etching takes up a large proportion of the overall shape-processing step and has a huge impact on the cover-glass production efficiency. It is therefore important to shorten the processing time required for etching.

Further, in the chemical etching process of the aforementioned method, poorly-soluble chemical substances elute into the etchant, which contains hydrofluoric acid, and adhere to the glass substrate. This not only impairs the surface quality of the etched cover glass, but also inhibits the progress of the etching process if large amounts of chemical substances adhere to the glass surface, which may extend the processing time and impair the accuracy in shape.

SUMMARY OF THE INVENTION

An object of the present disclosure is to provide a method for producing cover glasses with which the cover-glass production efficiency can be improved by increasing the etching rate, and to provide cover glasses produced thereby. Another object of the present disclosure is to provide a method for producing cover glasses with which cover glasses having complicated shapes can be produced with high shape accuracy, and to provide cover glasses produced thereby.

An aspect of the present invention relates to a method for producing a cover glass. The method involves:

a step of subjecting a glass substrate to shape-processing by etching, the glass substrate having been formed into a plate-like shape by a down-drawing process and containing, as components thereof, 50% to 70% by mass of $SiO_2$, 5% to 20% by mass of $Al_2O_3$, 6% to 30% by mass of $Na_2O$, and 0% to less than 8% by mass of $Li_2O$; and a step of forming a compressive-stress layer on the shape-processed glass substrate by subjecting the glass substrate to chemical strengthening.

Another aspect of the present invention relates to a method for producing a cover glass. The method involves:

a step of subjecting a glass substrate to shape-processing, the glass substrate having been formed into a plate-like shape and containing, as components thereof, 50% to 70% by mass of $SiO_2$, 5% to 20% by mass of $Al_2O_3$, 6% to 30% by mass of $Na_2O$, 0% to less than 8% by mass of $Li_2O$, and 0% to 2.6% by mass of CaO;

a step of processing at least an end surface of the shape-processed glass substrate by chemical etching; and a step of forming a compressive-stress layer on the processed glass substrate by subjecting the glass substrate to chemical strengthening.

Another aspect of the present invention relates to a cover glass. The cover glass is a plate-shaped glass substrate that has been formed into a plate-like shape by a down-drawing process, that has been subjected to shape-processing by etching, and that has been chemically strengthened so as to have a compressive-stress layer on the principal surfaces thereof.

The glass substrate contains, as components thereof, 50% to 70% by mass of $SiO_2$, 5% to 20% by mass of $Al_2O_3$, 6% to 30% by mass of $Na_2O$, and 0% to less than 8% by mass of $Li_2O$.

The glass substrate has an etching characteristic in which an etching rate is at least 3.7 μm/minute in an etching environment having a temperature of 22° C. and containing hydrogen fluoride with a concentration of 10% by mass.

Another aspect of the present invention relates to a cover glass. The cover glass is a plate-shaped glass substrate that has been subjected to shape-processing by etching and that has been chemically strengthened so as to have a compressive-stress layer on the principal surfaces thereof.

The glass substrate contains, as components thereof, 50% to 70% by mass of $SiO_2$, 5% to 20% by mass of $Al_2O_3$, 6% to 30% by mass of $Na_2O$, 0% to less than 8% by mass of $Li_2O$, and 0% to 2.6% by mass of CaO.

BRIEF DESCRIPTION OF THE DRAWINGS

FIGS. 4A and 4B illustrate how to evaluate the processing accuracy of glass-plate etching.

FIGS. 5A and 5B illustrate examples of observation images of glass plates taken with an optical microscope.

DESCRIPTION OF THE EMBODIMENTS

Cover glasses and methods for producing the same of the present disclosure will be described in detail below in accordance with first and second embodiments thereof. Note that the term "percentage (percent; %)" (or content by percentage) as used herein to indicate the content of each component constituting the glass refers to percentage by mass (mass %) unless stated otherwise.

A cover glass, as described in the first and second embodiments, is used for protecting the display screen of equipment such as mobile phones, digital cameras, PDAs, and FPDs. However, the cover glasses of the first and second embodiments are not limited to the aforementioned applications, and can also be employed, for example, as substrates for touch-panel displays, substrates for magnetic disks, cover glasses for solar batteries, and window panes. According to the first embodiment, the etching rate can be increased, thus improving the cover-glass production efficiency. The second embodiment allows cover glasses with high shape accuracy to be produced in addition to improving the cover-glass production efficiency, thus further improving the cover-glass production efficiency.

Cover Glass According to First Embodiment

Figure 1:
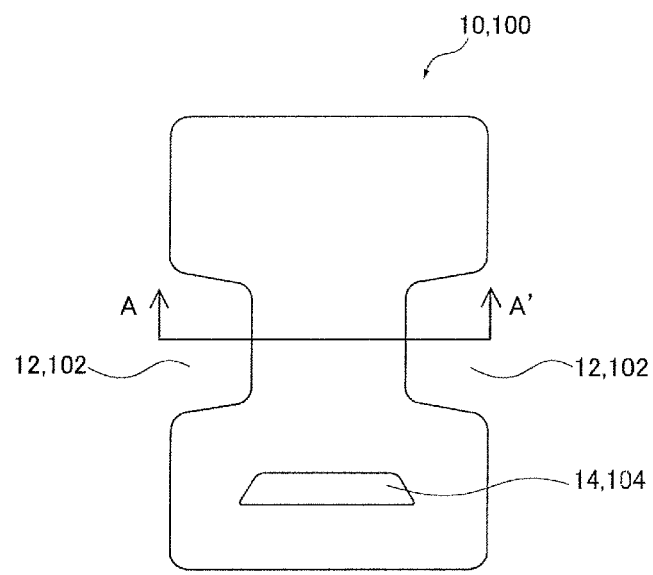
FIG. 1 illustrates an example of a cover glass according to an embodiment of the disclosure.

FIG. 1 illustrates a piece of cover glass 10 as an example of the present embodiment. The cover glass 10 illustrated in FIG. 1 has recesses 12 formed in the right and left sides (in the figure) of a piece of plate-shaped glass. In the cover glass 10, some sections of each recess 12 have negative curvatures as defined above. The cover glass 10 is also provided with a slit-form hole 14. The edge surrounding the hole 14 has sections with negative curvatures as defined above.

Figure 2:
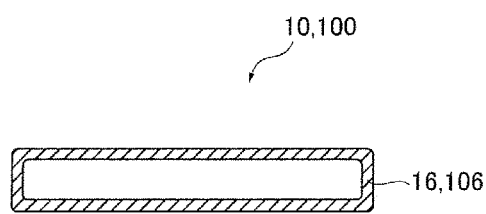
FIG. 2 is a cross-sectional view of the cover glass illustrated in FIG. 1 taken along line A-A' therein.

FIG. 2 is a cross-sectional view of the cover glass 10 of FIG. 1 taken in the direction of arrows A-A'. The cover glass 10 has a compressive-stress layer 16 formed on the principal surfaces thereof and also on the end surfaces thereof. The compressive-stress layer 16 can be formed on the end surfaces of the cover glass 10 as well as the principal surfaces by the cover glass 10 being subjected to a chemical strengthening process after shape-processing.

More specifically, the cover glass 10 is prepared by first subjecting a down-drawn glass substrate to shape-processing by etching, and then subjecting the etched glass substrate to chemical strengthening by an ion-exchange process. The glass substrate contains, as its components, 50% to 70% of $SiO_2$, 5% to 20% of $Al_2O_3$, 6% to 30% of $Na_2O$, and 0% to less than 8% of $Li_2O$. Further, the glass substrate has an etching characteristic in which the etching rate is at least 3.7 nm/minute in an etching environment having a temperature of 22° C. and containing hydrogen fluoride with a concentration of 10% by mass.

The composition of the glass substrate constituting the cover glass 10 will be described in detail below.

Composition of Glass Substrate According to First Embodiment

The glass substrate to be used for the cover glass 10 in the first embodiment contains $SiO_2$, $Al_2O_3$, and $Na_2O$, and may also contain $B_2O_3$, $Li_2O$, $K_2O$, MgO, CaO, SrO, BaO, ZnO, $ZrO_2$, $TiO_2$, $P_2O_5$, $SnO_2$, and $SO_3$, if necessary.

$SiO_2$:

$SiO_2$ is an essential component that constitutes the skeletal structure of the glass to be used for the glass substrate, and has the effect of improving the chemical durability and heat resistance of the glass. If the $SiO_2$ content by percentage is less than 50%, vitrification may become difficult and sufficient effects in durability and heat resistance may not be obtained, although the etching rate at the time of etching the glass substrate to perform shape-processing thereon tends to improve. On the other hand, if the $SiO_2$ content by percentage exceeds 70%, then the glass is likely to cause devitrification and the glass materials will become hard to melt and form, and also, the viscosity will increase and the glass will become hard to homogenize, thereby posing difficulty in mass-producing glass inexpensively by using down-drawing processes. Further, if the content by percentage exceeds 70%, the coefficient of thermal expansion will become too small and will less likely match the coefficients of thermal expansion of peripheral materials such as metals and organic adhesives. Furthermore, if the content by percentage exceeds 70%, the low-temperature viscosity will increase excessively and thus the ion-exchange rate will drop, resulting in that sufficient strength cannot be achieved even with chemical strengthening through ion exchange. Therefore, the content by percentage of $SiO_2$ is from 50% to 70%, preferably from 53% to 67%, more preferably from 53% to 65%, even more preferably from 55% to 65%, and particularly preferably from 58% to 63%. Note that the low-temperature viscosity refers to the temperature at $10^{7.6}$ to $10^{14.5}$ dPa·s, but in the present embodiment, it is defined as indicating the temperature at $10^{14.5}$ dPa·s.

$Al_2O_3$:

$Al_2O_3$ is an essential component that constitutes the skeletal structure of the glass to be used for the glass substrate, and has the effect of improving the chemical durability and heat resistance of the glass and of improving the ion-exchange performance and the etching rate at the time of performing shape-processing by etching. If the $Al_2O_3$ content by percentage is less than 5%, the aforementioned effects cannot be obtained sufficiently. On the other hand, if the $Al_2O_3$ content by percentage exceeds 20%, the glass will become hard to melt and also the viscosity of the glass will increase, which will make it hard to form. Thus, it becomes difficult to mass-produce glass inexpensively by using down-drawing processes. Further, if the $Al_2O_3$ content by percentage exceeds 20%, the acid resistance will become excessively poor, which is not preferable for a cover glass. Furthermore, if the $Al_2O_3$ content by percentage exceeds 20%, the glass is likely to cause devitrification and the devitrification resistance will deteriorate as well, which will make down-draw processing inapplicable. Therefore, the content by percentage of $Al_2O_3$ is from 5% to 20%, preferably from 5% to 17%, more preferably from 7% to 16%, and particularly preferably from 9% to 15%.

Note that in the present embodiment, it is preferable that, if the content by percentage of $SiO_2$ is X % and the content by percentage of $Al_2O_3$ is Y %, X-½·Y is 57.5% or less. In cases where X-½·Y is 57.5% or less, the etching rate of the glass substrate can be improved effectively. The range for X-½·Y is more preferably 56% or less, and even more preferably 55% or less.

On the other hand, if the range for X-½·Y is below 45%, the devitrification temperature will rise and thus the devitrification resistance will deteriorate, although the etching rate will reach 5 μm/minute or higher. Therefore, in order to achieve both an improvement in devitrification resistance and an improvement in etching rate, the range for X-½·Y is preferably 45% or greater, more preferably 47% or greater, and particularly preferably 50% or greater. Specifically, the range for X-½·Y is preferably 45% to 57.5%, more preferably 47% to 56%, and even more preferably 50% to 55%.

$B_2O_3$:

$B_2O_3$ is a component that decreases the viscosity of the glass and that promotes the melting and refining of the glass to be used for the glass substrate. If the content by percentage exceeds 5%, the acid resistance of the glass will deteriorate and also the amount of volatilization will increase, thereby making the glass hard to homogenize. Also, the increase in the amount of volatilization will cause unevenness in the components of the glass and will also cause unevenness in the etching on the glass substrate. That is, the etching rate will become uneven among the various areas of the glass, and therefore, a glass substrate containing an excessive amount of $B_2O_3$ is not suitable for purposes such as etching with the aim of shape-processing, which requires high accuracy. Further, if the $B_2O_3$ content by percentage exceeds 5%, then the strain point will be lowered, thus making the glass deform at the time of subjecting the glass substrate to thermal processing. Therefore, the $B_2O_3$ content by percentage is preferably from 0% to 5%, more preferably from 0% to 3%, even more preferably from 0% to less than 2%, and particularly preferably less than 0.01% and $B_2O_3$ should intentionally not be contained except for impurities. By adjusting the $B_2O_3$ content by percentage to 0% to 5%, it is possible to achieve the effect of improving the etching rate and also prevent unevenness in etching, thereby allowing the production of cover glasses with higher quality.

$Li_2O$:

$Li_2O$ is one of the ion-exchange components and is a component that reduces the viscosity of the glass to be used for the glass substrate and that improves the meltability and formability of the glass. $Li_2O$ is also a component that improves the Young's modulus of the glass substrate, and among various alkali metal oxides, $Li_2O$ is highly effective in increasing the stress value of the compressive-stress layer. However, if the $Li_2O$ content by percentage is too large, there will be a disadvantage that the ion-exchange salts will deteriorate too soon in the ion-exchange process, which is the step of strengthening the glass substrate, thereby leading to an increase in the production cost of the cover glass. Further, if the $Li_2O$ content by percentage is too large, then the coefficient of thermal expansion of the glass will become too large and the thermal shock resistance thereof will deteriorate, and also the coefficient of thermal expansion will less likely match the coefficients of thermal expansion of peripheral materials such as metals and organic adhesives. Furthermore, if the $Li_2O$ content by percentage is too large, then not only will the heat resistance deteriorate, but also the low-temperature viscosity will drop excessively; this will cause stress relaxation in the heating step after chemical strengthening and will reduce the stress value of the compressive-stress layer, resulting in not being able to produce a cover glass with sufficient strength. Therefore, the $Li_2O$ content by percentage is from 0% to less than 8%, preferably from 0% to 5%, more preferably from 0% to 2%, even more preferably from 0% to 1%, further more preferably from 0% to 0.02%, and desirably less than 0.01%, and it is particularly preferable that $Li_2O$ is intentionally not contained except for impurities.

$Na_2O$:

$Na_2O$ is one of the ion-exchange components and is an essential component that reduces the high-temperature viscosity of the glass to be used for the glass substrate and that improves the meltability and formability of the glass. Further, $Na_2O$ is a component that improves the devitrification resistance of the glass. If the $Na_2O$ content by percentage is less than 6%, the meltability of the glass will deteriorate, which will increase the cost for melting. Further, if the $Na_2O$ content by percentage is less than 6%, then the ion-exchange performance will also deteriorate, resulting in that sufficient strength cannot be achieved. Furthermore, if the $Na_2O$ content by percentage is less than 6%, then the coefficient of thermal expansion will be too small and will less likely match the coefficients of thermal expansion of peripheral materials such as metals and organic adhesives. Moreover, if the $Na_2O$ content by percentage is less than 6%, the glass is likely to cause devitrification and the devitrification resistance will deteriorate as well, which will make down-draw processing inapplicable and thereby pose difficulty in mass-producing glass inexpensively. On the other hand, if the $Na_2O$ content by percentage exceeds 30%, then the low-temperature viscosity will drop and the impact resistance will deteriorate, and also the coefficient of thermal expansion will be too large and will less likely match the coefficients of thermal expansion of peripheral materials such as metals and organic adhesives. Further, if the $Na_2O$ content by percentage exceeds 30%, also the devitrification resistance will deteriorate due to the loss of balance in the glass, thereby posing difficulty in mass-producing glass inexpensively by using down-drawing processes. Therefore, the $Na_2O$ content by percentage is from 6% to 30%, preferably from 7% to 27%, more preferably from 10% to 20%, even more preferably from 12% to 20%, and particularly preferably from 13% to 19%.

Further, in the present embodiment, the difference found by subtracting the $Al_2O_3$ content by percentage from the $Na_2O$ content by percentage ("$Na_2O$ content percentage–$Al_2O_3$ content percentage") is preferably from −10% to 15%. When the difference "$Na_2O$ content percentage–$Al_2O_3$ content percentage" is within the range of −10% to 15%, then not only can the cover-glass production efficiency be improved, but also the meltability of the glass can be improved while keeping the coefficient of thermal expansion and heat resistance at a suitable level. Therefore, the glass can be molten at lower temperatures, thereby allowing further reductions in the cost for producing the cover glass. Note that the range for the difference "$Na_2O$ content percentage–$Al_2O_3$ content percentage" is more preferably from −5% to 13%, even more preferably from −5% to 10%, and further more preferably from −3% to 5%.

K$_2$O:

K$_2$O is one of the ion-exchange components and is a component that can improve the ion-exchange performance of the glass substrate by being included therein. K$_2$O also reduces the high-temperature viscosity of the glass, improves the meltability and formability thereof, and also improves the devitrification resistance. However, if the K$_2$O content by percentage is too large, the low-temperature viscosity will drop, the coefficient of thermal expansion will become too large, and the impact resistance will become poor, which is not preferable for a cover glass. Further, if the K$_2$O content by percentage is too large, the coefficient of thermal expansion will less likely match the coefficients of thermal expansion of peripheral materials such as metals and organic adhesives. Furthermore, if the K$_2$O content by percentage is too large, also the devitrification resistance will deteriorate due to the loss of balance in the glass, thereby posing difficulty in mass-producing glass inexpensively by using down-drawing processes. Therefore, the K$_2$O content by percentage is 15% or less, preferably 10% or less, more preferably less than 5.6%, even more preferably less than 5%, and particularly preferably less than 4%. On the other hand, the lower limit of the K$_2$O content by percentage is 0% or greater, preferably 0.1% or greater, more preferably 1% or greater, and even more preferably 2% or greater. Adjusting the lower limit of the K$_2$O content by percentage to be within the aforementioned range not only improves the etching rate, but can also shorten the time required for ion-exchange processing and improve the cover glass productivity. Specifically, the content percent of K$_2$O is preferably 0% to 15%, preferably 0.1% to 10%, more preferably 1% to less than 5.6%, even more preferably 2% to less than 5%, and particularly preferably 2% to less than 4%.

R$^1_2$O (R$^1$ includes all the elements among Li, Na, and K that are contained in the glass substrate):

In the present embodiment, the R$^1_2$O content by percentage is preferably from 6% to 30%. If the percentage of R$^1_2$O is less than 6%, ion exchange will not be performed sufficiently and thus a sufficient strength cannot be obtained, thereby posing difficulty in using the glass substrate for a cover glass. On the other hand, if the percentage of R$^1_2$O exceeds 30%, the devitrification temperature will be increased due to the loss of balance in the glass, which will make down-draw processing hard to employ and thereby pose difficulty in mass-producing glass inexpensively. In order to achieve both mechanical strength and devitrification resistance and to improve productivity, the R$^1_2$O content by percentage is more preferably from 10% to 28%, even more preferably from 14% to 25%, further more preferably from 15% to 24%, and particularly preferably from 17% to 23%.

Note that the aforementioned range for the content by percentage of R$^1_2$O is a criterion to be satisfied in addition to each range of content by percentage as set forth above for the oxide of each of the elements among Li, Na, and K contained in the glass substrate.

B$_2$O$_3$/R$^1_2$O (R$^1$ includes all the elements among Li, Na, and K that are contained in the glass substrate):

In the present embodiment, the ratio in content by percentage between B$_2$O$_3$ and R$^1_2$O ("B$_2$O$_3$/R$^1_2$O") is preferably from 0 to less than 0.3. B$_2$O$_3$ is prone to bond with an alkali metal oxide and volatilize as an alkali borate, and particularly, Li$^+$, which has a small ionic radius, has high mobility in the glass melt and is prone to volatilize from the surface of the melt, and volatilization is likely to create a concentration gradient up to the inner part of the glass and to give rise to striae on the surface of the glass. In other words, an increase in the amount of volatilization of B$_2$O$_3$ will make the produced glass substrate nonuniform, and unevenness in etching will occur due to the nonuniformity of the glass substrate when such a glass substrate is subjected to etching. However, alkali metal oxides are essential components to glass that is chemically strengthened by an ion-exchange process. Therefore, the ratio B$_2$O$_3$/R$^1_2$O in content by percentage (the ratio in percentage by mass) is preferably adjusted to be within the range of 0 to less than 0.3. In this range, the nonuniformity of the glass and unevenness in etching can be reduced effectively. Thus, not only is the etching rate improved, but also unevenness in etching rate can be prevented, thereby allowing strengthened glass of desired shape to be produced with high yield. Note that the range for the ratio B$_2$O$_3$/R$^1_2$O in content by percentage is more preferably from 0 to 0.1, even more preferably from 0 to 0.07, further preferably from 0 to 0.03, even more preferably from 0 to 0.005, and particularly preferably 0. Further, in order to reduce unevenness in etching, it is most preferable that the Li$_2$O content by percentage is less than 0.01% and Li$_2$O should intentionally not be contained except for impurities, as described above.

MgO:

MgO is a component that decreases the viscosity of the glass to be used for the glass substrate and that promotes the melting and refining of the glass. Also, among alkaline-earth metals, MgO is an effective component for improving the meltability while making the glass lightweight, because it only increases the glass density by a small rate. MgO also improves formability and increases the strain point and Young's modulus of the glass. Furthermore, the rate at which crystallized products are produced at the time of etching MgO-containing glass by using e.g. hydrofluoric acid is relatively low, and therefore, it is relatively less likely for the crystallized products to adhere to the glass surface during etching. Thus, it is preferable to include MgO in order to improve the glass meltability and to increase the etching rate. However, if the MgO content is too large, then the devitrification resistance will deteriorate, thus posing difficulty in mass-producing glass inexpensively by using down-drawing processes. Therefore, the MgO content by percentage is from 0% to 15%, preferably greater than 1% to 15%, more preferably greater than 1% to 12%, further preferably greater than 1% to less than 7%, even more preferably from 3% to less than 7%, and particularly preferably greater than 4.5% to 6%. The inclusion of MgO within the range of 0% to 15% will improve the etching rate and will also allow the glass to be molten at lower temperatures, thereby allowing further reductions in the cost for producing the cover glass. Furthermore, because it is possible to improve the ion-exchange performance and increase the strain point at the same time, the MgO-containing glass is suitable for cover glasses that require high mechanical strength. This is because a sufficient compressive-stress layer can be formed on the surface of the glass substrate, and the compressive-stress layer formed on the surface can be prevented from causing stress relaxation, even during/after thermal treatment.

CaO:

CaO is a component that decreases the viscosity of the glass to be used for the glass substrate and that promotes the melting and refining of the glass. Also, among alkaline-earth metals, CaO is an effective component for improving the meltability while making the glass lightweight, because it only increases the glass density by a small rate. CaO also improves formability and increases the strain point and Young's modulus of the glass. However, if the CaO content is too large, then the devitrification resistance will deteriorate, thus posing difficulty in mass-producing glass inexpensively by using down-drawing processes. Also, if the CaO content is too large, the ion-exchange performance will deteriorate; thus, sufficient strength cannot be achieved, and also productivity will be reduced. Further, the crystallized products produced at the time of subjecting glass that contains large amounts of CaO to wet-etching by using e.g. hydrofluoric acid are not only insoluble in the etchant solution, but are produced at an extremely high precipitation rate. Therefore, such crystallized products adhere to the surface of the glass being etched, and if the adherence amount is large, the etching reaction will be inhibited and the glass-processing quality will be impaired. On the other hand, the inclusion of CaO can lower the devitrification temperature and improve the devitrification resistance and meltability. Therefore, the CaO content by percentage is from 0% to 10%, preferably from 0% to 8%, more preferably from 0% to 6%, even more preferably from 0% to 4%, and particularly preferably from 0% to 2%. Note that in cases where an extremely-high etching quality is required, it is preferable that substantially no CaO is contained.

Further, it is even more preferable to include both MgO and CaO in order to reduce the melt viscosity and at the same time lower the devitrification temperature, but the amount of CaO shall be adjusted as appropriate to fall within the range that will not give rise to the aforementioned problems caused by the crystallized products produced during etching.

SrO:

SrO is a component that decreases the viscosity of the glass to be used for the glass substrate and that promotes the melting and refining of the glass. SrO also improves formability and increases the strain point and Young's modulus of the glass. However, if the SrO content is too large, then the glass density will increase, and the glass will be unsuitable for cover glasses, which are required to be lightweight. Further, if the SrO content is too large, then the coefficient of thermal expansion will be too large and will less likely match the coefficients of thermal expansion of peripheral materials such as metals and organic adhesives. Furthermore, if the SrO content is too large, then the ion-exchange performance will also deteriorate, making it difficult to obtain the high mechanical strength demanded of cover glasses. Therefore, the SrO content by percentage is preferably from 0% to 10%, more preferably from 0% to 5%, even more preferably from 0% to 2%, and further more preferably from 0% to 0.5%, and it is particularly preferable that SrO is intentionally not contained except for impurities.

BaO:

BaO is a component that decreases the viscosity of the glass to be used for the glass substrate and that promotes the melting and refining of the glass. BaO also improves formability and increases the strain point and Young's modulus of the glass. However, if the BaO content is too large, then the glass density will increase, and the glass will be unsuitable for cover glasses, which are required to be lightweight. Further, if the BaO content is too large, then the coefficient of thermal expansion will be too large and will less likely match the coefficients of thermal expansion of peripheral materials such as metals and organic adhesives. Furthermore, if the BaO content is too large, then the ion-exchange performance will also deteriorate, making it difficult to obtain the high mechanical strength demanded of cover glasses. Therefore, the BaO content by percentage is preferably from 0% to 10%, more preferably from 0% to 5%, even more preferably from 0% to 2%, and further more preferably from 0% to 0.5%. Note that, because BaO places a heavy burden on the environment, it is particularly preferable that the BaO content is less than 0.01% and BaO should intentionally not be contained except for impurities.

SrO+BaO:

In the present embodiment, the sum found by adding the SrO content by percentage and the BaO content by percentage ("SrO content percentage+BaO content percentage") is preferably less than 10%. When the sum "SrO content percentage+BaO content percentage" is less than 10%, it is possible to effectively prevent an increase in the glass density and a decrease in the ion-exchange rate. That is, adjusting the sum "SrO content percentage+BaO content percentage" to less than 10% will not only improve the etching rate, but can also achieve the effect of making the cover glass lightweight and the effect of improving productivity and glass strength. Note that the range for the sum "SrO content percentage+BaO content percentage" is preferably from 0% to 8%, more preferably from 0% to 5%, even more preferably from 0% to 2%, and further more preferably from 0% to 1%, and it is particularly preferable that SrO and BaO are intentionally not contained except for impurities.

RO (R includes all the elements among Mg, Ca, Sr, and Ba that are contained in the glass substrate):

Herein, the RO content by percentage is preferably from 0% to 20%. If the RO content is greater than 20%, the chemical durability will deteriorate. On the other hand, the inclusion of RO can improve the meltability and heat resistance of the glass. Therefore, the RO content by percentage is preferably from 0% to 10%, more preferably from 0% to 7%, even more preferably from 2% to 7%, further preferably from 3% to 7%, and further more preferably from 4% to 7%.

Note that the aforementioned range for the content by percentage of RO is a criterion to be satisfied in addition to each range of content by percentage as set forth above for the oxide of each of the elements among Mg, Ca, Sr, and Ba contained in the glass substrate.

$Li_2O/(RO+Li_2O)$:

In the present embodiment, the ratio in content by percentage between $Li_2O$ and the sum of RO and $Li_2O$ ("$Li_2O/(RO+Li_2O)$"; wherein R includes at least one type of element selected from Mg, Ca, Sr, and Ba) is preferably less than 0.3. In this way, it is possible to inhibit the deterioration of ion-exchange salts in the ion-exchange process, which is the step of strengthening the glass substrate, and it is thus possible to reduce the cost for producing the strengthened glass to be used as the cover glass. Further, if the ratio "$Li_2O/(RO+Li_2O)$" in content by percentage is less than 0.3, the devitrification temperature can be lowered effectively, and thus, the devitrification resistance can be improved effectively. Further, if the ratio "$Li_2O/(RO+Li_2O)$" in content by percentage is less than 0.3, then the strain point can be increased effectively and also the heat resistance can be improved. That is, adjusting the ratio "$Li_2O/(RO+Li_2O)$" in content by percentage to less than 0.3 not only increases the etching rate, but can also improve the heat resistance and prevent such problems as stress relaxation during chemical strengthening and the deformation of glass during other thermal treatments. Note that the range for the ratio "$Li_2O/(RO+Li_2O)$" in content by percentage is more preferably 0.08 or less, even more preferably 0.05 or less, further more preferably 0.01 or less, and particularly preferably 0.

ZnO:

ZnO is a component that improves the ion-exchange performance, that is highly effective particularly in improving the compressive-stress value, and that lowers the high-temperature viscosity of the glass without lowering the low-temperature viscosity. However, if the ZnO content is too large, the glass will cause phase separation and the devitrification resistance will deteriorate. Further, if the ZnO content is too large, then the glass density will increase, and the glass will be unsuitable for cover glasses, which are required to be lightweight. Therefore, the ZnO content by percentage is preferably from 0% to 6%, more preferably from 0% to 4%, even more preferably from 0% to 1%, further more preferably from 0% to 0.1%, and particularly preferably less than 0.01% and ZnO should intentionally not be contained except for impurities.

$ZrO_2$:

$ZrO_2$ is a component that significantly improves the ion-exchange performance and that increases the strain point and the viscosity near the devitrification temperature of the glass. Further, $ZrO_2$ improves the heat resistance of the glass. However, if the $ZrO_2$ content is too large, the devitrification temperature will be increased and the devitrification resistance will deteriorate. Therefore, in order to prevent a reduction in devitrification resistance, the $ZrO_2$ content by percentage is preferably from 0% to 15%, more preferably from 0% to 10%, even more preferably from 0% to 6% or less, and further more preferably from 0% to 4% or less. By including $ZrO_2$, it is possible to effectively improve heat resistance, which is important for cover glasses used in mobile phones and for cover glasses used in touch-panel displays, and to effectively improve ion-exchange performance, which relates to the reduction of time for chemically strengthening the glass substrate and to the improvement of the mechanical strength thereof. Therefore, the $ZrO_2$ content by percentage is preferably 0.1% or greater, more preferably 0.5% or greater, even more preferably 1% or greater, and particularly preferably 2% or greater. That is, by adjusting the $ZrO_2$ content by percentage to 0.1% or greater, the heat resistance and ion-exchange performance can be improved while also improving devitrification resistance. Thus, the time required for ion-exchange processing can be reduced, and thus productivity can be improved. It is also possible to prevent the glass from deforming during the chemical strengthening process and other thermal treatments, and thus the yield of cover glasses can be enhanced.

On the other hand, if the glass density is to be reduced, then the $ZrO_2$ content by percentage should preferably be less than 0.1%, and it is particularly preferable that $ZrO_2$ is intentionally not contained except for impurities.

$TiO_2$:

$TiO_2$ is a component that improves the ion-exchange performance and that reduces the high-temperature viscosity of the glass. However, if the $TiO_2$ content is too large, the devitrification resistance will deteriorate. Further, if the $TiO_2$ content is too large, then the UV transmittance will deteriorate and the glass will be stained, which is not suitable for cover glasses or the like. Furthermore, if the $TiO_2$ content is too large, then the UV transmittance will deteriorate, thus causing a disadvantage that, in the case of using a UV-curable resin, the resin cannot be cured sufficiently. Therefore, the $TiO_2$ content by percentage is preferably from 0% to 5%, more preferably from 0% to less than 3%, even more preferably from 0% to 1%, and further more preferably from 0% to 0.01%, and it is particularly preferable that $TiO_2$ is intentionally not contained except for impurities.

$(ZrO_2+TiO_2)/SiO_2$:

In the present embodiment, the ratio in content by percentage between the sum of $ZrO_2$ and $TiO_2$ to $SiO_2$ ("$(ZrO_2+TiO_2)/SiO_2$") is preferably from 0% to 0.2%. In the case of shape-processing a glass substrate by etching, ion-exchange processing will be performed after etching. In the ion-exchange process, deformation may occur due to the internal stress within the glass substrate if ion exchange is carried out excessively. In other words, excessive ion exchange gives rise to the deformation of the glass substrate, and thus the shape that has been processed with high accuracy by etching cannot be retained and the glass substrate becomes unsuitable for a cover glass. So, by adjusting the ratio "$(ZrO_2+TiO_2)/SiO_2$" in content by percentage to be within the range of 0 to 0.2 excessive ion exchange can be inhibited effectively. Note that the range for the ratio "$(ZrO_2+TiO_2)/SiO_2$" in content by percentage is preferably from 0 to 0.15, more preferably from 0 to 0.1, even more preferably from 0 to 0.07, and particularly preferably from 0 to 0.01. When the ratio "$(ZrO_2+TiO_2)/SiO_2$" in content by percentage is within the range of 0 to 0.2, the devitrification resistance as well as the heat resistance can be improved while preventing excessive ion exchange.

$P_2O_5$:

$P_2O_5$ is a component that improves the ion-exchange performance and that is highly effective particularly in increasing the thickness of the compressive-stress layer. However, if the $P_2O_5$ content is too large, the glass will cause phase separation and the water resistance will deteriorate. Therefore, the $P_2O_5$ content by percentage is preferably from 0% to 10%, more preferably from 0% to 4%, even more preferably from 0% to 1%, further more preferably from 0% to 0.1%, and particularly preferably less than 0.01% and $P_2O_5$ should intentionally not be contained except for impurities.

In addition to the aforementioned components, the glass substrate contains refining agents as described below.

Refining Agent:

A refining agent is a component necessary for the refining of the glass to be used for the glass substrate. No refining effect can be obtained if the content is less than 0.001%, whereas the content exceeding 5% may cause devitrification and/or staining. Therefore, the total content by percentage of refining agent(s) is preferably from 0.001% to 5%, more preferably from 0.01% to 3%, even more preferably from 0.05% to 1%, and particularly preferably from 0.05% to 0.5%.

The refining agents are not particularly limited as far as they have little burden on the environment and provide the glass with excellent clarity. Examples include one or more types of agents selected from the group of oxides of metals including, for example, Sn, Fe, Ce, Tb, Mo, and W.

The following ranges are preferable for the metal oxides, the oxides being expressed as $SnO_2$, $Fe_2O_3$, and $CeO_2$.

$SnO_2$ is a component that is prone to devitrify the glass. So, in order to prevent devitrification while improving the clarity, it is preferable that the $SnO_2$ content by percentage is from 0% to 0.5%, more preferably from 0.01% to 0.5%, even more preferably from 0.05% to 0.3%, and further more preferably from 0.1% to 0.2%.

$Fe_2O_3$ is a component that stains the glass. So, in order to achieve a suitable transmittance while improving the clarity, it is preferable that the $Fe_2O_3$ content by percentage is from 0% to 0.2%, more preferably from 0.01% to 0.2%, even more preferably from 0.05% to 0.15%, and further more preferably from 0.05% to 0.10%. Note that, particularly in cases where transparency and UV transmission characteristics are demanded of the glass, it is preferable that the $Fe_2O_3$ content is less than 0.02%, and particularly preferable that $Fe_2O_3$ is intentionally not contained except for impurities.

The $CeO_2$ content by percentage is preferably from 0% to 1.2%, more preferably from 0.01% to 1.2%, even more preferably from 0.05% to 1.0%, and particularly preferably from 0.3% to 1.0%.

Further, in cases where particularly high transmittance is demanded of glass, such as in a cover glass, it is desirable to employ $SO_3$ as the refining agent. It is preferable that the $SO_3$ content by percentage is from 0% to 5%, preferably from 0.001% to 5%, more preferably from 0.01% to 3%, even more preferably from 0.05% to 1%, further more preferably from 0.05% to 0.5%, and particularly preferably from 0.05% to 0.20%. In the case of employing $SO_3$ as the refining agent, the combined use in the melting step of carbon and a sulfate, such as sodium sulfate, serving as the source of $SO_3$ can achieve an even higher refining effect. Note that $SO_3$ can be used in combination with other refining agents, as described above.

$As_2O_3$, $Sb_2O_3$, and PbO also have the effect of refining glass by causing reactions that involve a change in valance in molten glass. However, these compounds place a heavy burden on the environment. Therefore, in the glass substrate of the present embodiment, the amount of these compounds is limited so that $As_2O_3$, $Sb_2O_3$, and PbO are substantially not included in the glass. Note that, herein, the expression "$As_2O_3$, $Sb_2O_3$, and PbO are substantially not included" means that the content is less than 0.01% and that these compounds are intentionally not included except for impurities.

Oxides of rare-earth elements, such as $Nb_2O_5$ and $La_2O_3$, are components that increase the Young's modulus of the glass to be used for the glass substrate. However, if the content of these compounds is too large, the devitrification resistance will deteriorate. Therefore, the content by percentage of rare-earth oxides, such as $Nb_2O_5$ and $La_2O_3$, is preferably 3% or less, more preferably 1% or less, even more preferably 0.5% or less, and particularly preferably less than 0.1% and these compounds should intentionally not be included except for impurities.

Note that in the present embodiment, components that stain the glass, such as Co and Ni, are not preferable because such components reduce the transmittance of the glass substrate or the strengthened glass obtained after ion-exchange processing. In the case of touch-panel displays, for example, a reduction in the transmittance of the glass substrate or the strengthened glass is not preferable because the visibility of the touch-panel display will be impaired. Therefore, the content of transition metal elements that stain the glass, such as Co and Ni, is preferably 1% or less, more preferably 0.5% or less, even more preferably 0.05% or less, and particularly preferably less than 0.05% and such compounds should intentionally not be included except for impurities.

Method for Producing Cover Glass According to First Embodiment

The method for producing a cover glass according to the present embodiment will be described below. The cover-glass production method involves the following steps (1) to (4):

(1) a step of melting glass materials in which the components have been formulated and blended so as to provide the glass substrate with the aforementioned composition;

(2) a step of forming the molten glass, which has been molten in the melting step, into a plate-like shape by a down-draw process;

(3) a step of subjecting the plate-like shaped glass to shape-processing by etching; and (4) a step of forming a compressive-stress layer on the surfaces of the shape-processed glass by subjecting the glass to chemical strengthening.

The down-draw process used in Step (2) above includes such processes as the overflow down-draw process and the slot down-draw process. Among them, the overflow down-draw process is suitably used.

Step (1):

Step (1) is the step of melting glass materials in which the components have been formulated and blended so as to provide the glass substrate with the aforementioned glass composition.

More specifically, the glass materials corresponding to the aforementioned components are measured and blended, are placed in a melting pot made, for example, of fire brick, platinum, or a platinum alloy, where they are heated and molten, and then are subjected to refining and homogenization, thereby preparing molten glass having a desired composition.

Step (2):

Step (2) is the step of forming the molten glass having the desired composition, which has been prepared in Step (1), into a plate-like shape by a down-draw process. The down-draw process is a known process disclosed, for example, in JP-A-2009-203080. In the down-draw process, molten glass is fed into a trough which is provided on a forming body and is made to flow over both sides of the trough. The overflowed molten glass flows downward along both the side surfaces of the forming body having a wedge-shaped cross section and located below the trough, creating two flows of molten glass which join at the lowermost end of the forming body. The joining of the two flows results in a strip of glass, which is drawn by drawing rollers provided below the forming body. Thus, the molten glass is formed into a strip of glass having a predetermined thickness.

There are various processes for forming glass into a plate-like shape, including various down-draw processes, the float process, the re-draw process, and the roll-out process. The present embodiment employs the down-draw process, because glass substrates formed by using the down-draw process are improved in etching rate, as compared to other forming processes such as the float process. Another reason is that the principal surfaces of a glass substrate formed by using the down-draw process are extremely smooth, because they are made by hot forming.

More specifically, in the case of shape-processing the aforementioned glass substrate by etching, the glass substrate can be etched evenly from both the principal surfaces thereof at the time of etching the glass substrate from the principal surfaces thereof that have resist patterns thereon serving as masks. In other words, the uniform composition of the glass substrate enhances the dimensional accuracy in etching and also improves the sectional shape of the end surfaces of the cover glass, which may be used in a mobile phone, a touch-panel display, etc.

Also, both the principal surfaces of the glass substrate formed by using the down-draw process have a uniform composition, and therefore, there will be no difference in the ion-exchange rate between the principal surfaces during the later-described ion-exchange process. Thus, the glass substrate can be prevented from warping after ion exchange due to a difference in composition. In other words, it becomes possible to produce homogeneous cover glasses, to improve productivity, and to reduce costs.

Further, forming the glass by using the down-draw process can do away with the polishing step after forming, thus further reducing costs and improving productivity. Also, forming by using the down-draw process can produce glass substrates with surfaces having no microcracks, which, in turn, can improve the strength of the glass substrates.

Step (3):

Step (3) is the step of subjecting the plate-shaped glass substrate to shape-processing by etching, to process the glass substrate into a desired shape.

The following explains how the cover glass is subjected to shape-processing by etching prior to the ion-exchange processing step.

First, both the principal surfaces of the plate-shaped glass substrate prepared as above are coated with a resist material. Then, the resist material is exposed via a photo mask having a desired outer-shape pattern. The outer shape is not particularly limited, and it may be an outer shape including, for example, sections having negative curvatures, as illustrated in FIG. 1.

Next, the exposed resist material is developed to thus form a resist pattern on the glass substrate in regions other than the regions-to-be-etched, and then, the regions-to-be-etched on the glass substrate are etched. If a wet etchant is used as the etchant, the glass substrate will be etched isotropically. Thus, each end surface of the glass substrate will be formed so as to have: a central section that projects outward the most; and sloped faces that curve gently from the central section toward the respective principal surfaces. It is preferable that the boundaries between the sloped faces and the respective principal surfaces and the boundary between the two sloped faces are rounded.

The resist material to be used in the etching step is not particularly limited, and it is possible to use a material that is resistant to the etchant used for etching the glass while using the resist pattern as a mask. For example, glass is, in general, corroded by wet etching using an aqueous solution containing hydrofluoric acid or by dry etching using a fluorine-based gas, so resist materials having excellent resistance to hydrofluoric acid are suitable. As for the etchant, it is possible to suitably use a mixed acid containing at least one of hydrofluoric acid, sulfuric acid, nitric acid, hydrochloric acid, and hydrofluorosilicic acid. The use of hydrofluoric acid or the aforementioned mixed-acid aqueous solution as the etchant can produce cover glasses with desired shapes.

Further, even complicated outer shapes can be created easily, just by adjusting the mask pattern at the time of performing shape-processing by employing etching. Further, performing shape-processing through etching can further improve productivity and also cut down processing costs. As for the stripping solution for stripping the resist material off from the glass substrate, an alkaline solution such as KOH or NaOH may be used. The type of resist material, etchant, and stripping solution can be selected as appropriate depending on the material of the glass substrate.

Note that the etching process is not limited to the process of simply immersing the glass substrate into an etching solution, but instead it is possible to employ, for example, spray etching in which the etching solution is sprayed.

By subjecting the glass substrate to shape-processing by employing etching as described above, it is possible to produce a cover glass having end surfaces with a highly-smooth surface roughness. More specifically, it is possible to prevent microcracks, which are inevitably created in shape-processing that employs machining, and to thus further improve the mechanical strength of the cover glass.

The glass substrate of the present embodiment has an etching characteristic in which the etching rate is at least 3.7 μm/minute in an etching environment having a temperature of 22° C. and containing hydrogen fluoride with a concentration of 10% by mass. The above etching characteristic can be achieved by adjusting the composition of the glass substrate in a manner such that, if the content of the aforementioned $SiO_2$ is X % and the content of the aforementioned $Al_2O_3$ is Y %, X-½·Y is 57.5% or less.

Step (4):

Step (4) is the step of subjecting the glass substrate shape-processed in Step (3) to an ion-exchange process.

The cover glass according to the present embodiment is produced by performing an ion-exchange process on the glass substrate that has been shape-processed in Step (3) as described above. More specifically, for example, after being rinsed, the glass substrate is immersed for around 1 to 25 hours in a treatment bath containing 100% of $KNO_3$ and kept at around 350° C. to 550° C., to thereby exchange the $Na^+$ ions on the superficial layer of the glass with $K^+$ ions present in the treatment bath. In this way, the glass substrate can be chemically strengthened. Note that the temperature, the length of time, the ion-exchange solution, etc., for the ion-exchange process can be changed as appropriate. For example, the ion-exchange solution may be a mixed solution containing two or more types of compounds.

The foregoing was a description on the cover glass of the first embodiment.

Next, the cover glass according to the second embodiment will be described below. The glass substrate to be used in the cover glass of the second embodiment is a preferable embodiment of the glass substrate according to the first embodiment, in that the content by percentage of CaO has been limited. This limitation not only improves the etching rate during etching, which is performed as the shape-processing step, as in the first embodiment, but can also provide the end surfaces of the glass with uniform etching surfaces—i.e., can improve the processing accuracy.

Cover Glass According to Second Embodiment

As with the cover glass of the first embodiment, the cover glass according to the second embodiment also has the shape and features as illustrated in FIG. 1. As illustrated in FIG. 1, the cover glass 100 of the second embodiment has recesses 102 formed in the right and left sides (in the figure) of a piece of plate-shaped glass. Some sections of each recess 102 have negative curvatures as defined above. The cover glass 100 is also provided with a slit-form hole 104. The edge surrounding the hole 104 has sections with negative curvatures as defined above.

As illustrated in FIG. 2, the cover glass 100 has a compressive-stress layer 106 formed on the principal surfaces thereof and also on the end surfaces thereof. The compressive-stress layer 106 can be formed on the end surfaces of the cover glass 100 as well as the principal surfaces by the cover glass 100 being subjected to a chemical strengthening process after shape-processing.

More specifically, the cover glass 100 is prepared by first subjecting a glass substrate that has been formed into a plate-like shape by a down-draw process, to shape-processing by a processing technique including chemical etching, and then subjecting the shape-processed glass substrate to chemical strengthening by an ion-exchange process. The glass substrate contains, as its components, 50% to 70% of $SiO_2$, 5% to 20% of $Al_2O_3$, 6% to 30% of $Na_2O$, 0% to less than 8% of $Li_2O$, and 0% to 2.6% of CaO. The content by percentage of CaO is preferably 1.5% or less, more preferably 1.0% or less, even more preferably 0.2% or less, and it is particularly preferable that substantially no CaO is included. Herein, the expression "substantially no CaO is included" means that the content is less than 0.01% and CaO is intentionally not included except for impurities. Further, the glass substrate has an etching characteristic in which the etching rate is at least 3.7 μm/minute in an etching environment having a temperature of 22° C. and containing hydrogen fluoride with a concentration of 10% by mass.

The composition of the glass substrate constituting the cover glass 100 will be described in detail below.

Composition of Glass Substrate According to Second Embodiment

The glass substrate to be used for the cover glass 100 contains $SiO_2$, $Al_2O_3$, and $Na_2O$, and may also contain $B_2O_3$, $Li_2O$, $K_2O$, MgO, CaO, SrO, BaO, ZnO, $ZrO_2$, $TiO_2$, $P_2O_5$, $SnO_2$, and $SO_3$, if necessary. In the following, the essential components refer to components that need to be included in the glass substrate, whereas the optional components refer to components that do not have to be included at all in the glass substrate.

$SiO_2$:

$SiO_2$ is an essential component that constitutes the skeletal structure of the glass to be used for the glass substrate, and has the effect of improving the chemical durability and heat resistance of the glass. If the $SiO_2$ content by percentage is less than 50%, vitrification may become difficult and sufficient effects in durability and heat resistance may not be obtained, although the etching rate at the time of etching the glass substrate to perform shape-processing thereon tends to improve. On the other hand, if the $SiO_2$ content by percentage exceeds 70%, then the glass is likely to cause devitrification and the glass materials will become hard to melt and form, and also, the viscosity will increase and the glass will become hard to homogenize, thereby posing difficulty in mass-producing glass inexpensively by using down-drawing processes. Further, if the content by percentage exceeds 70%, the coefficient of thermal expansion will become too small and will less likely match the coefficients of thermal expansion of peripheral materials such as metals and organic adhesives. Furthermore, if the content by percentage exceeds 70%, the low-temperature viscosity will increase excessively and thus the ion-exchange rate will drop, resulting in that sufficient strength cannot be achieved even with chemical strengthening through ion exchange. Therefore, the content by percentage of $SiO_2$ is from 50% to 70%, preferably from 53% to 67%, more preferably from 55% to 67%, even more preferably from 58% to 65%, and particularly preferably from 60% to 65%. Note that low-temperature viscosity refers to the temperature at $10^{7.6}$ to $10^{14.5}$ dPa·s, but in the present embodiment, it is defined as indicating the temperature at $10^{14.5}$ dPa·s.

$Al_2O_3$:

$Al_2O_3$ is an essential component that constitutes the skeletal structure of the glass to be used for the glass substrate, and has the effect of improving the chemical durability and heat resistance of the glass and of improving the ion-exchange performance and the etching rate at the time of performing shape-processing by etching. If the $Al_2O_3$ content by percentage is less than 5%, the aforementioned effects cannot be obtained sufficiently. On the other hand, if the $Al_2O_3$ content by percentage exceeds 20%, the glass will become hard to melt and also the viscosity of the glass will increase, which will make it hard to form. Thus, it becomes difficult to mass-produce glass inexpensively by using down-drawing processes. Further, if the $Al_2O_3$ content by percentage exceeds 20%, the acid resistance will become excessively poor, which is not preferable for a cover glass which is used as a protective component. Furthermore, if the $Al_2O_3$ content by percentage exceeds 20%, the glass is likely to cause devitrification and the devitrification resistance will deteriorate as well, which will make down-draw processing inapplicable. Therefore, the content by percentage of $Al_2O_3$ is from 5% to 20%, preferably from 5% to 17%, more preferably from 7% to 16%, and particularly preferably from 9% to 15%.

Note that in the present embodiment, it is preferable that, if the content by percentage of $SiO_2$ is X % and the content by percentage of $Al_2O_3$ is Y %, X-½·Y is 57.5% or less. When X-½·Y is 57.5% or less, the etching rate of the glass substrate can be improved effectively. The preferable range for X-½·Y is more preferably 56% or less, and even more preferably 55% or less.

On the other hand, if X-½·Y is below 45%, the devitrification temperature will rise and thus the devitrification resistance will deteriorate, although the etching rate will reach 5 μm/minute or higher. Therefore, in order to achieve both an improvement in devitrification resistance and an improvement in etching rate, X-½·Y is preferably 45% or greater, more preferably 47% or greater, and particularly preferably 50% or greater. Specifically, the range for X-½·Y is preferably 45% to 57.5%, more preferably 47% to 56%, and even more preferably 50% to 55%.

$B_2O_3$:

$B_2O_3$ is an optional component that decreases the viscosity of the glass and that promotes the melting and refining of the glass to be used for the glass substrate. If the content by percentage exceeds 5%, the acid resistance of the glass will deteriorate and also volatilization will increase, thereby making the glass hard to homogenize. Also, the increase in volatilization will cause unevenness in the glass and will also cause unevenness in the etching on the glass substrate. That is, the etching rate will become uneven among the various areas of the glass, and therefore, a glass substrate containing an excessive amount of $B_2O_3$ is not suitable for purposes such as etching with the aim of shape-processing, which requires high accuracy. Therefore, the $B_2O_3$ content by percentage is preferably from 0% to 5%, more preferably from 0% to 3%, even more preferably from 0% to less than 2%, and particularly preferably less than 0.01% and $B_2O_3$ should intentionally not be contained except for impurities. By adjusting the $B_2O_3$ content by percentage to 0% to 5%, it is possible to achieve the effect of improving the etching rate and also prevent unevenness in etching, thereby allowing the production of cover glasses with higher quality.

$Li_2O$:

$Li_2O$ is one of the ion-exchange components and is an optional component that reduces the viscosity of the glass to be used for the glass substrate and that improves the meltability and formability of the glass. $Li_2O$ is also a component that improves the Young's modulus of the glass substrate, and among various alkali metal oxides, $Li_2O$ is highly effective in increasing the depth of the compressive-stress layer. However, if the $Li_2O$ content by percentage is too large, there will be a disadvantage that the ion-exchange salts will deteriorate too soon in the ion-exchange process, which is the step of strengthening the glass substrate, thereby leading to an increase in the production cost of the cover glass. Furthermore, if the $Li_2O$ content by percentage is too large, then not only will the heat resistance deteriorate excessively (the strain point and the glass transition point drop excessively), but also the low-temperature viscosity will drop excessively; this will cause stress relaxation in the heating step after chemical strengthening and will reduce the stress value of the compressive-stress layer, resulting in not being able to produce a cover glass with sufficient strength. Therefore, the $Li_2O$ content by percentage is from 0% to less than 8%, preferably from 0% to 5%, more preferably from 0% to 2%, even more preferably from 0% to 1%, further more preferably from 0% to 0.02%, and desirably less than 0.01%, and it is particularly preferable that $Li_2O$ is intentionally not contained except for impurities.

Meanwhile, if the strain point and the glass transition point become too high, it becomes necessary to increase the temperature for the ion-exchange process optimal for ensuring a compressive-stress layer having predetermined characteristics that would match the glass composition. However, if the ion-exchange processing temperature becomes too high, then the ion-exchange processing temperature may exceed the decomposition temperature of the ion-exchange salts. Incidentally, $Li_2O$ can effectively reduce the molten glass transition point and the strain point, so the ion-exchange processing temperature can be reduced by increasing the content by percentage of $Li_2O$. However, if the $Li_2O$ content becomes too large, then it becomes difficult to observe fringe patterns in the ion-exchanged strengthened glass that are related to the refractive index, thus making it difficult to measure the stress value and the thickness of the compressive-stress layer with a stress meter while retaining the shape of the strengthened glass. Therefore, if it is desired to facilitate the measurement of the compressive-stress layer and at the same time reduce the ion-exchange processing temperature, then it is preferable to adjust the content by percentage of $Li_2O$ to greater than 0%—i.e., to include $Li_2O$ in the glass composition—and more preferably to 0.001% or greater, even more preferably to 0.01% or greater, and further more preferably to 0.02% or greater. Also, the $Li_2O$ content is suitably 1.3% or less, preferably less than 0.5%, more preferably less than 0.4%, even more preferably 0.3% or less, and particularly preferably 0.2% or less. Specifically, the content percentage of $Li_2O$ is preferably 0.001% to 1.3%, more preferably 0.01% to less than 0.5%, even more preferably 0.02% to less than 0.4%, further more preferably 0.02% to 0.3%, and particularly preferably 0.02% to 0.2%.

$Na_2O$:

$Na_2O$ is one of the ion-exchange components and is an essential component that reduces the high-temperature viscosity of the glass to be used for the glass substrate and that improves the meltability and formability of the glass. Further, $Na_2O$ is a component that improves the devitrification resistance of the glass. If the $Na_2O$ content by percentage is less than 10%, the meltability of the glass will deteriorate, which will increase the cost for melting. Further, if the $Na_2O$ content by percentage is less than 10%, then the ion-exchange performance will also deteriorate, resulting in that sufficient strength cannot be achieved. Furthermore, if the $Na_2O$ content by percentage is less than 10%, then the coefficient of thermal expansion will be too small and will less likely match the coefficients of thermal expansion of peripheral materials such as metals and organic adhesives. Moreover, if the $Na_2O$ content by percentage is less than 10%, the glass is likely to cause devitrification and the devitrification resistance will deteriorate as well, which will make down-draw processing inapplicable and thereby pose difficulty in mass-producing glass inexpensively. On the other hand, if the $Na_2O$ content by percentage exceeds 25%, then the low-temperature viscosity will drop and the impact resistance will deteriorate, and also the coefficient of thermal expansion will be too large and will less likely match the coefficients of thermal expansion of peripheral materials such as metals and organic adhesives. Therefore, the $Na_2O$ content by percentage is from 6% to 30%, preferably from 10% to 25%, more preferably from 10% to 20%, even more preferably from 12% to 20%, and particularly preferably from 13% to 19%.

Further, in the present embodiment, the difference found by subtracting the $Al_2O_3$ content by percentage from the $Na_2O$ content by percentage ("$Na_2O$ content percentage–$Al_2O_3$ content percentage") is preferably from −10% to 15%. When the difference "$Na_2O$ content percentage–$Al_2O_3$ content percentage" is within the range of −10% to 15%, then not only can the objects described in the present disclosure be achieved, but also the meltability of the glass can be improved while keeping the coefficient of thermal expansion and heat resistance at a suitable level. Therefore, the glass can be molten at lower temperatures, thereby allowing further reductions in the cost for producing the cover glass. Note that the range for the difference "$Na_2O$ content percentage–$Al_2O_3$ content percentage" is more preferably from −5% to 13%, even more preferably from −5% to 10%, and further more preferably from −3% to 5%.

$K_2O$:

$K_2O$ is an optional component that can improve the ion-exchange performance of the glass substrate by being included therein. $K_2O$ also reduces the high-temperature viscosity of the glass, improves the meltability and formability thereof, and also improves the devitrification resistance. However, if the $K_2O$ content is too large, the low-temperature viscosity will drop, the coefficient of thermal expansion will become too large, and the impact resistance will become poor, which is not preferable for a cover glass. Further, if the $K_2O$ content by percentage is too large, the coefficient of thermal expansion will less likely match the coefficients of thermal expansion of peripheral materials such as metals and organic adhesives. Therefore, the $K_2O$ content by percentage is 15% or less, preferably 10% or less, more preferably less than 5.6%, even more preferably less than 5%, and particularly preferably less than 4%. On the other hand, the lower limit of the $K_2O$ content by percentage is 0% or greater, preferably 0.1% or greater, more preferably 1% or greater, and even more preferably 2% or greater. Adjusting the lower limit of the $K_2O$ content by percentage to be within the aforementioned range not only improves the etching rate, but can also shorten the time required for ion-exchange processing and improve the cover glass productivity. Specifically, the content percent of $K_2O$ is preferably 0% to 15%, more preferably 0.1% to 10%, even more preferably 1% to less than 5.6%, further more preferably 2% to less than 5%, and particularly preferably 2% to less than 4%.

$R^1_2O$ ($R^1$ includes all the elements among Li, Na, and K that are contained in the glass substrate):

In the present embodiment, the $R^1_2O$ content by percentage (the total content by percentage of all the elements among Li, Na, and K that are contained in the glass substrate) is preferably from 6% to 30%. If the percentage of $R^1_2O$ is less than 6%, ion exchange will not be performed sufficiently and thus a sufficient strength cannot be obtained, thereby posing difficulty in using the glass substrate for a cover glass. On the other hand, if the percentage of $R^1_2O$ exceeds 30%, the chemical durability of the glass will deteriorate. So, in order to achieve both mechanical strength and devitrification resistance and to improve chemical durability and productivity, the $R^1_2O$ content by percentage is more preferably from 10% to 28%, even more preferably from 14% to 25%, further more preferably from 15% to 24%, and particularly preferably from 17% to 23%.

Note that the aforementioned range for the content by percentage of $R^1_2O$ is a criterion to be satisfied in addition to each range of content by percentage as set forth above for the oxide of each of the elements among Li, Na, and K contained in the glass substrate.

$B_2O_3/R^1_2O$ ($R^1$ includes all the elements among Li, Na, and K that are contained in the glass substrate):

In the present embodiment, the ratio in content by percentage between $B_2O_3$ and $R^1_2O$ ("$B_2O_3/R^1_2O$") is preferably from 0 to less than 0.3. $B_2O_3$ is prone to bond with an alkali metal oxide and volatilize as an alkali borate, and particularly, $Li^+$, which has a small ionic radius, has high mobility in the glass melt and is prone to volatilize from the surface of the melt, and volatilization is likely to create a concentration gradient up to the inner part of the glass and to give rise to striae on the surface of the glass. In other words, an increase in the amount of volatilization of $B_2O_3$ will make the produced glass substrate nonuniform, and unevenness in etching will occur due to the nonuniformity of the glass substrate when such a glass substrate is subjected to etching. However, alkali metal oxides are essential components to glass that is chemically strengthened by an ion-exchange process. Therefore, the ratio $B_2O_3/R^1_2O$ in content by percentage (the ratio in percentage by mass) is preferably adjusted to be within the range of 0 to less than 0.3. In this range, the nonuniformity of the glass and unevenness in etching can be reduced effectively. Thus, not only is the etching rate improved, but also unevenness in etching rate can be prevented, thereby allowing strengthened glass of desired shape to be produced with high yield. Note that the range for the ratio $B_2O_3/R^1_2O$ in content by percentage is more preferably from 0 to 0.1, preferably from 0 to 0.07, more preferably from 0 to 0.03, even more preferably from 0 to 0.005, and particularly preferably 0. Further, in order to reduce unevenness in etching, it is preferable that the $Li_2O$ content by percentage is less than 0.01% and $Li_2O$ should intentionally not be contained except for impurities, as described above.

MgO:

MgO is an optional component that decreases the viscosity of the glass to be used for the glass substrate and that promotes the melting and refining of the glass. Also, among alkaline-earth metals, MgO is an effective component for improving the meltability while making the glass lightweight, because it only increases the glass density by a small rate. MgO also improves formability and increases the strain point and Young's modulus of the glass. Furthermore, the precipitations that are produced at the time of etching MgO-containing glass by using e.g. hydrofluoric acid have large solubility and relatively low production rate, and therefore, it is relatively less likely for the precipitations to adhere to the glass surface during etching. Thus, it is preferable to include MgO in order to improve the glass meltability and to increase the etching rate. However, if the MgO content is too large, then the devitrification resistance will deteriorate, thus posing difficulty in mass-producing glass inexpensively by using down-drawing processes. Therefore, the MgO content by percentage is from 0% to 15%, preferably greater than 1% to 15%, more preferably greater than 1% to 12%, further preferably greater than 1% to less than 7%, even more preferably from 3% to less than 7%, and particularly preferably greater than 4.5% to 6%. The inclusion of MgO within the range of 0% to 15% will improve the etching rate and will also allow the glass to be molten at lower temperatures, thereby allowing further reductions in the cost for producing the cover glass. Furthermore, because it is possible to improve the ion-exchange performance and increase the strain point at the same time, the MgO-containing glass is suitable for cover glasses that require high mechanical strength. This is because a sufficient compressive-stress layer can be formed on the surface of the glass substrate, and the compressive-stress layer formed on the surface can be prevented from causing stress relaxation, even during/after thermal treatment.

CaO:

CaO is an optional component that decreases the viscosity of the glass to be used for the glass substrate and that promotes the melting and refining of the glass. Also, among alkaline-earth metals, CaO is an effective component for improving the meltability while making the glass lightweight, because it only increases the glass density by a small rate. CaO also improves formability and increases the strain point and Young's modulus of the glass. However, if the CaO content is too large, then the devitrification resistance will deteriorate, thus posing difficulty in mass-producing glass inexpensively by using down-drawing processes. Also, if the CaO content is too large, the ion-exchange performance will deteriorate; thus, sufficient strength cannot be achieved, and also productivity will be reduced. Further, the precipitations (chemical substances) produced at the time of subjecting glass that contains large amounts of CaO to wet-etching by using e.g. hydrofluoric acid are not only insoluble in the etchant solution, but also are produced at an extremely high precipitation rate. Therefore, such precipitations adhere to the surface of the glass being etched, and if the adherence amount is large, the etching reaction will be inhibited, the glass-processing productivity will be impaired, and also the glass surface after etching will be degraded. In other words, the inclusion of CaO will not only degrade the surface quality of the etched cover glass, but may also inhibit the progress of etching if large amounts of precipitations adhere to the glass surface, which may extend the etching time and deteriorate the shape accuracy (processing accuracy). On the other hand, the inclusion of CaO can lower the devitrification temperature and improve the devitrification resistance and meltability. Therefore, the CaO content by percentage is from 0% to 2.6%, preferably from 0% to 1.5%, more preferably from 0% to 1.0%, even more preferably from 0% to 0.6%, and further more preferably from 0% to 0.2%. Note that in cases where an extremely-high etching quality is required, it is preferable that substantially no CaO is contained.

Further, it is even more preferable to include both MgO and CaO in order to reduce the melt viscosity and at the same time lower the devitrification temperature, but the amount of CaO shall be adjusted as appropriate to fall within the range that will not give rise to the aforementioned problems caused by the precipitations formed during etching. Therefore, the upper limit of the content by percentage of CaO is 2.6%.

SrO:

SrO is an optional component that decreases the viscosity of the glass to be used for the glass substrate and that promotes the melting and refining of the glass. SrO also improves formability and increases the strain point and Young's modulus of the glass. However, if the SrO content is too large, then the glass density will increase, and the glass will be unsuitable for cover glasses, which are required to be lightweight. Further, if the SrO content is too large, then the coefficient of thermal expansion will be too large and will less likely match the coefficients of thermal expansion of peripheral materials such as metals and organic adhesives.

Furthermore, if the SrO content is too large, then the ion-exchange performance will also deteriorate, making it difficult to obtain the high mechanical strength demanded of cover glasses. Therefore, the SrO content by percentage is preferably from 0% to 10%, more preferably from 0% to 5%, even more preferably from 0% to 2%, and further more preferably from 0% to 0.5%, and it is particularly preferable that SrO is intentionally not contained except for impurities.

BaO:

BaO is an optional component that decreases the viscosity of the glass to be used for the glass substrate and that promotes the melting and refining of the glass. BaO also improves formability and increases the strain point and Young's modulus of the glass. However, if the BaO content is too large, then the glass density will increase, and the glass will be unsuitable for cover glasses, which are required to be lightweight. Further, if the BaO content is too large, then the coefficient of thermal expansion will be too large and will less likely match the coefficients of thermal expansion of peripheral materials such as metals and organic adhesives. Furthermore, if the BaO content is too large, then the ion-exchange performance will also deteriorate, making it difficult to obtain the high mechanical strength demanded of cover glasses. Therefore, the BaO content by percentage is preferably from 0% to 10%, more preferably from 0% to 5%, even more preferably from 0% to 2%, and further more preferably from 0% to 0.5%. Note that, because BaO places a heavy burden on the environment, it is particularly preferable that the BaO content is less than 0.01% and BaO should intentionally not be contained except for impurities.

SrO+BaO:

In the present embodiment, the sum found by adding the SrO content by percentage and the BaO content by percentage ("SrO content percentage+BaO content percentage") is preferably less than 10%. When the sum "SrO content percentage+BaO content percentage" is less than 10%, it is possible to effectively prevent an increase in the glass density and a decrease in the ion-exchange rate. That is, adjusting the sum "SrO content percentage+BaO content percentage" to less than 10% will not only improve the etching rate, but can also achieve the effect of making the cover glass lightweight and the effect of improving productivity and glass strength. Note that the range for the sum "SrO content percentage+BaO content percentage" is preferably from 0% to 8%, more preferably from 0% to 5%, even more preferably from 0% to 2%, and further more preferably from 0% to 1%, and it is particularly preferable that SrO and BaO are intentionally not contained except for impurities.

RO (R includes all the elements among Mg, Ca, Sr, and Ba that are contained in the glass substrate):

Herein, the RO content by percentage (the total content by percentage of all the elements among Mg, Ca, Sr, and Ba that are contained in the glass substrate) is preferably from 0% to 20%. If the RO content is greater than 20%, the chemical durability will deteriorate. On the other hand, the inclusion of RO can improve the meltability and heat resistance of the glass. Therefore, the RO content by percentage is preferably from 0% to 10%, more preferably from 0% to 7%, even more preferably from 2% to 7%, further preferably from 3% to 7%, and further more preferably from 4% to 7%.

Note that the aforementioned range for the content by percentage of RO is a criterion to be satisfied in addition to each range of content by percentage as set forth above for the oxide of each of the elements among Mg, Ca, Sr, and Ba contained in the glass substrate.

$Li_2O/(RO+Li_2O)$:

In the present embodiment, the ratio in content by percentage between $Li_2O$ and the sum of RO and $Li_2O$ ("$Li_2O/(RO+Li_2O)$"; wherein R includes all the elements selected from Mg, Ca, Sr, and Ba that are contained in the glass substrate) is preferably less than 0.3. By adjusting the ratio $Li_2O/(RO+Li_2O)$ in content by percentage to be within the aforementioned range, it is possible to inhibit the deterioration of ion-exchange salts in the ion-exchange process, which is the step of strengthening the glass substrate, and it is thus possible to reduce the cost for producing the strengthened glass to be used as the cover glass. Further, if the ratio "$Li_2O/(RO+Li_2O)$" in content by percentage is less than 0.3, the devitrification temperature can be lowered effectively, and thus, the devitrification resistance can be improved effectively. Further, if the ratio "$Li_2O/(RO+Li_2O)$" in content by percentage is less than 0.3, then the strain point can be increased effectively and also the heat resistance can be improved. That is, such a content by percentage not only increases the etching rate, but can also improve the heat resistance and prevent such problems as stress relaxation during chemical strengthening. Note that the range for the ratio "$Li_2O/(RO+Li_2O)$" in content by percentage is more preferably 0.08 or less, even more preferably 0.05 or less, further more preferably 0.01 or less, and particularly preferably 0.

ZnO:

ZnO is an optional component that improves the ion-exchange performance, that is highly effective particularly in improving the compressive-stress value, and that lowers the high-temperature viscosity of the glass without lowering the low-temperature viscosity. However, if the ZnO content is too large, the glass will cause phase separation and the devitrification resistance will deteriorate. Further, if the ZnO content is too large, then the glass density will increase, and the glass will be unsuitable for cover glasses, which are required to be lightweight. Therefore, the ZnO content by percentage is preferably from 0% to 6%, more preferably from 0% to 4%, even more preferably from 0% to 1%, further more preferably from 0% to 0.1%, and particularly preferably less than 0.01% and ZnO should intentionally not be contained except for impurities.

$ZrO_2$:

$ZrO_2$ is an optional component that significantly improves the ion-exchange performance and that increases the strain point and the viscosity near the devitrification temperature of the glass. Further, $ZrO_2$ improves the heat resistance of the glass. However, if the $ZrO_2$ content is too large, the devitrification temperature will be increased and the devitrification resistance will deteriorate. Therefore, in order to prevent a reduction in devitrification resistance, the $ZrO_2$ content by percentage is preferably from 0% to 10%, more preferably from 0% to 6% or less, even more preferably from 0% to 4% or less, and further more preferably from 0% to 2% or less. By including $ZrO_2$, it is possible to effectively improve heat resistance, which is important for cover glasses used in mobile phones and for cover glasses used in touch-panel displays, and to effectively improve ion-exchange performance, which relates to the reduction of time for chemically strengthening the glass substrate and to the improvement of the mechanical strength thereof. Therefore, the $ZrO_2$ content by percentage is preferably 0.1% or greater, more preferably 0.5% or greater, even more preferably 1% or greater, and particularly preferably 2% or greater. That is, by adjusting the $ZrO_2$ content by percentage to 0.1% or greater, the heat resistance and ion-exchange performance can be improved while also improving devitrification resistance. Thus, the time required for ion-exchange processing can be reduced, and thus productivity can be improved.

On the other hand, if the glass density is to be reduced, then the $ZrO_2$ content by percentage should preferably be less than 0.1%, and it is particularly preferable that $ZrO_2$ is intentionally not contained except for impurities.

$TiO_2$:

$TiO_2$ is an optional component that improves the ion-exchange performance and that reduces the high-temperature viscosity of the glass. However, if the $TiO_2$ content is too large, the devitrification resistance will deteriorate. Further, if the $TiO_2$ content is too large, then the UV transmittance will deteriorate and the glass will be stained, which is not suitable for cover glasses or the like. Furthermore, if the $TiO_2$ content is too large, then the UV transmittance will deteriorate, thus causing a disadvantage that, in the case of using a UV-curable resin, the resin cannot be cured sufficiently. Therefore, the $TiO_2$ content by percentage is preferably from 0% to 5%, more preferably from 0% to less than 3%, even more preferably from 0% to 1%, and further more preferably from 0% to 0.01%, and it is particularly preferable that $TiO_2$ is intentionally not contained except for impurities.

$(ZrO_2+TiO_2)/SiO_2$:

In the present embodiment, the ratio in content by percentage between the sum of $ZrO_2$ and $TiO_2$ to $SiO_2$ ("$(ZrO_2+TiO_2)/SiO_2$") is preferably from 0 to 0.2. In the case of shape-processing a glass substrate by etching, ion-exchange processing will be performed after etching. In the ion-exchange process, deformation may occur due to the internal stress within the glass substrate if ion exchange is carried out excessively. In other words, excessive ion exchange gives rise to the deformation of the glass substrate, and thus the shape that has been processed with high accuracy by etching cannot be retained and the glass substrate becomes unsuitable for a cover glass. So, by adjusting the ratio "$(ZrO_2+TiO_2)/SiO_2$" in content by percentage to be within the range of 0 to 0.2, excessive ion exchange can be inhibited effectively. Note that the range for the ratio "$(ZrO_2+TiO_2)/SiO_2$" in content by percentage is preferably from 0 to 0.15, more preferably from 0 to 0.1, even more preferably from 0 to 0.07, and particularly preferably from 0 to 0.01. When the ratio "$(ZrO_2+TiO_2)/SiO_2$" in content by percentage is within the range of 0 to 0.2, the devitrification resistance as well as the heat resistance can be improved while preventing excessive ion exchange.

$P_2O_5$:

$P_2O_5$ is an optional component that improves the ion-exchange performance and that is highly effective particularly in increasing the thickness of the compressive-stress layer. However, if the $P_2O_5$ content is too large, the glass will cause phase separation and the water resistance will deteriorate. Therefore, the $P_2O_5$ content by percentage is preferably from 0% to 10%, more preferably from 0% to 4%, even more preferably from 0% to 1%, further more preferably from 0% to 0.1%, and particularly preferably less than 0.01% and $P_2O_5$ should intentionally not be contained except for impurities.

In addition to the aforementioned components, the glass substrate contains refining agents as described below.

Refining Agent:

A refining agent is a component necessary for the refining of the glass to be used for the glass substrate. No refining effect can be obtained if the content is less than 0.001%, whereas the content exceeding 5% may cause devitrification and/or staining. Therefore, the total content by percentage of refining agent(s) is preferably from 0.001% to 2%, more preferably from 0.01% to 1%, even more preferably from 0.05% to 0.5%, and particularly preferably from 0.05% to 0.2%.

The refining agents are not particularly limited as far as they have little burden on the environment and provide the glass with excellent clarity. Examples include one or more types of agents selected from the group of oxides of metals including, for example, Sn, Fe, Ce, Tb, Mo, and W.

The following ranges are preferable for the metal oxides, the oxides being expressed as $SnO_2$, $Fe_2O_3$, and $CeO_2$.

$SnO_2$ is a component that is prone to devitrify the glass. So, in order to prevent devitrification while improving the clarity, it is preferable that the $SnO_2$ content by percentage is from 0% to 0.5%, more preferably from 0.01% to 0.5%, even more preferably from 0.05% to 0.3%, and further more preferably from 0.1% to 0.2%.

$Fe_2O_3$ is a component that stains the glass. So, in order to achieve a suitable transmittance while improving the clarity, it is preferable that the $Fe_2O_3$ content by percentage is from 0% to 0.2%, more preferably from 0.01% to 0.2%, even more preferably from 0.05% to 0.15%, and further more preferably from 0.05% to 0.10%. Note that, particularly in cases where transparency and UV transmission characteristics are demanded of the glass, it is preferable that the $Fe_2O_3$ content is less than 0.02%, and particularly preferable that $Fe_2O_3$ is intentionally not contained except for impurities.

The $CeO_2$ content by percentage is preferably from 0% to 1.2%, more preferably from 0.01% to 1.2%, even more preferably from 0.05% to 1.0%, and particularly preferably from 0.3% to 1.0%.

Further, for cover glasses that require a particularly high transmittance, it is desirable to employ $SO_3$ as the refining agent. It is preferable that the $SO_3$ content by percentage is from 0% to 5%, preferably from 0.001% to 5%, more preferably from 0.01% to 3%, even more preferably from 0.05% to 1%, further more preferably from 0.05% to 0.5%, and particularly preferably from 0.05% to 0.20%. In the case of employing $SO_3$ as the refining agent, the combined use in the melting step of carbon and a sulfate, such as sodium sulfate, serving as the source of $SO_3$ can achieve an even higher refining effect. Note that $SO_3$ can be used in combination with other refining agents, as described above.

$As_2O_3$ and $Sb_2O_3$ also have the effect of refining glass by causing reactions that involve a change in valance in molten glass. However, these compounds place a heavy burden on the environment. Therefore, in the glass substrate of the present embodiment, the amount of these compounds is limited so that $As_2O_3$ and $Sb_2O_3$ are substantially not included in the glass. Note that, herein, the expression "$As_2O_3$ and $Sb_2O_3$ are substantially not included" means that the content is less than 0.01% and that these compounds are intentionally not included except for impurities. Further, PbO and F have the effect of improving the glass meltability and refining the glass. However, these compounds place a heavy burden on the environment. Therefore, in the cover glass of the present embodiment, it is preferable that PbO and F are substantially not included in the glass.

Oxides of rare-earth elements, such as $Nb_2O_5$ and $La_2O_3$, are optional components that increase the Young's modulus of the glass to be used for the glass substrate. However, if the content of these compounds is too large, the devitrification resistance will deteriorate. Therefore, the content by percentage of rare-earth oxides, such as $Nb_2O_5$ and $La_2O_3$, is preferably 3% or less, more preferably 1% or less, even more preferably 0.5% or less, and particularly preferably less than 0.1% and these compounds should intentionally not be included except for impurities.

Note that in the present embodiment, components that stain the glass, such as Co and Ni, are not preferable because such components reduce the transmittance of the glass substrate or the strengthened glass obtained after ion-exchange processing. In the case of touch-panel displays, for example, a reduction in the transmittance of the glass substrate or the strengthened glass is not preferable because the visibility of the touch-panel display will be impaired. Therefore, the content of transition metal elements that stain the glass, such as Co and Ni, is preferably 1% or less, more preferably 0.5% or less, even more preferably 0.05% or less, and particularly preferably less than 0.05% and such compounds should intentionally not be included except for impurities.

Method for Producing Cover Glass According to Second Embodiment

The method for producing a cover glass according to the present embodiment will be described below. The cover-glass production method involves the following steps (1) to (4):

(1) a step of melting glass materials in which the components have been formulated and blended so as to provide the glass substrate with the aforementioned composition;

(2) a step of forming the molten glass, which has been molten in the melting step, into a plate-like shape;

(3) a step of subjecting the plate-like shaped glass substrate to shape-processing by a processing technique including at least chemical etching; and (4) a step of forming a compressive-stress layer on the surfaces of the shape-processed glass substrate by subjecting the glass to chemical strengthening.

Step (1):

Step (1) is the step of melting glass materials in which the components have been formulated and blended so as to provide the glass substrate with the aforementioned glass composition.

More specifically, the glass materials corresponding to the aforementioned components are measured and blended, are placed in a melting pot made, for example, of fire brick, platinum, or a platinum alloy, where they are heated and molten, and then are subjected to refining and homogenization, thereby preparing molten glass having a desired composition.

Step (2):

Step (2) is the step of forming the molten glass having the desired composition, which has been prepared in Step (1), into a plate-like shape. In the present embodiment, it is preferable to use a down-draw process for this forming step. The down-draw process is a known process disclosed, for example, in JP-A-2009-203080. In the down-draw process, molten glass is fed into a trough which is provided on a forming body and is made to flow over both sides of the trough. The overflowed molten glass flows downward along both the side surfaces of the forming body having a wedge-shaped cross section and located below the trough, creating two flows of molten glass which join at the lowermost end of the forming body. The joining of the two flows results in a strip of glass, which is drawn by drawing rollers provided below the forming body. Thus, the molten glass is formed into a strip of glass having a predetermined thickness.

There are various processes for forming glass into a plate-like shape, including various down-draw processes, the float process, the re-draw process, and the roll-out process. Any one of these processes can be employed, but in the present embodiment, it is most suitable to employ the down-draw process—and particularly the overflow down-draw process. The down-draw process is employed because glass substrates formed by using the down-draw process are improved in etching rate, as compared to other forming processes such as the float process. Another reason is that the principal surfaces of a glass substrate formed by using the down-draw process are extremely smooth, because they are made by hot forming.

In contrast, with the known float process, a diffusion layer of tin (Sn) is formed on the glass surface, and this gives rise to a difference in diffusion rate of alkali ions between the front and back principal surfaces of the glass at the time of chemical strengthening, thus posing difficulty in forming the compressive-stress layer stably. Meanwhile, the press-forming process suffers in that large plate-shaped substrates cannot be produced. With the other sheet-forming processes, the produced glass substrate cannot be employed as a cover glass unless the principal surfaces are polished, leading to an increase in processing cost. The down-draw process employed in the present embodiment has none of these disadvantages.

A glass substrate formed into a sheet by the down-draw process can be made extremely smooth and thin. Therefore, in the case of shape-processing the glass substrate by etching, the glass substrate can be etched evenly from both the principal surfaces thereof at the time of etching the glass substrate from the principal surfaces thereof that have resist patterns thereon serving as masks. In other words, the uniform composition of the glass substrate enhances the dimensional accuracy in etching and also improves the sectional shape of the end surfaces of the cover glass, which may be used in a mobile phone, a touch-panel display, etc.

Also, both the principal surfaces of the glass substrate formed by using the down-draw process have a uniform composition, and therefore, there will be no difference in the ion-exchange rate between the principal surfaces during the later-described ion-exchange process. Thus, the glass substrate can be prevented from warping after ion exchange due to a difference in composition. In other words, it becomes possible to produce homogeneous cover glasses, to improve productivity, and to reduce costs.

Further, forming the glass into a plate-like shape by using the down-draw process can do away with the polishing step after forming, thus further reducing costs and improving productivity. Also, forming by using the down-draw process can produce glass substrates with surfaces having no microcracks, which, in turn, can improve the strength of the glass substrates.

Step (3):

Step (3) is the shape-processing step by subjecting the plate-shaped glass substrate to at least chemical etching, to process the glass substrate into a desired shape. Note that "shape-processing" refers to the forming of the shape of the principal surfaces of the formed glass substrate, and does not include the processing of only the end surfaces of the glass substrate.

The following explains how the cover glass is subjected to etching for the shape-processing thereof prior to the ion-exchange processing step.

First, both the principal surfaces of the plate-shaped glass substrate prepared as above are coated with a resist material. Then, the resist material is exposed via a photo mask having a desired outer-shape pattern. The outer shape is not particularly limited, and it may be an outer shape including, for example, sections having negative curvatures, as illustrated in FIG. 1.

Next, the exposed resist material is developed to thus form a resist pattern on the glass substrate in regions other than the regions-to-be-etched, and then, the regions-to-be-etched on the glass substrate are etched. If a wet etchant is used as the etchant, the glass substrate will be etched isotropically. Thus, each end surface of the glass substrate will be formed so as to have: a central section that projects outward the most; and sloped faces that curve gently from the central section toward the respective principal surfaces. It is preferable that the boundaries between the sloped faces and the respective principal surfaces and the boundary between the two sloped faces are rounded.

The resist material to be used in the etching step is not particularly limited, and it is possible to use a material that is resistant to the etchant used for etching the glass while using the resist pattern as a mask. For example, glass is, in general, corroded by wet etching using an aqueous solution containing hydrofluoric acid or by dry etching using a fluorine-based gas, so resist materials having excellent resistance to hydrofluoric acid are suitable. As for the etchant, it is possible to suitably use hydrofluoric acid, or a mixed acid containing hydrofluoric acid and at least one of sulfuric acid, nitric acid, hydrochloric acid, and hydrofluorosilicic acid. The use of hydrofluoric acid or the aforementioned mixed-acid aqueous solution as the etchant can produce cover glasses with desired shapes.

The etchant used for effectively dissolving the glass contains hydrogen fluoride. In the etching process, the fluorine (F) in the hydrogen fluoride (HF) bonds with the dissolved metal ions contained in the glass components, and fluorine compounds precipitate in the etchant. The fluorine compounds include calcium fluoride, magnesium fluoride, and aluminum fluoride. If these precipitates are produced, they will adhere to the glass surface during etching, thereby inhibiting the progress of etching. Calcium fluoride, in particular, has a high production rate and extremely low solubility once it precipitates. So, in order to inhibit the production of calcium fluoride during the etching step, it is effective to reduce the amount of CaO introduced in the glass components, or substantially not introduce CaO at all.

Further, even complicated outer shapes can be created easily, just by adjusting the mask pattern at the time of performing shape-processing by employing etching. Further, performing shape-processing through etching can further improve productivity and also cut down processing costs. As for the stripping solution for stripping the resist material off from the glass substrate, an alkaline solution such as KOH or NaOH may be used. The type of resist material, etchant, and stripping solution can be selected as appropriate depending on the material of the glass substrate.

Note that the etching method is not limited to the method of simply immersing the glass substrate into an etching solution, but instead it is possible to employ, for example, spray etching in which the etching solution is sprayed. The method of immersing the glass substrate into an etching solution is preferred over the spray-etching method because of the simplicity of the device and etching process. The immersion method, however, is prone to cause precipitations, such as calcium fluoride, to adhere to the glass surface during etching, and thus there is a significant need to improve the etching rate. By employing the glass composition of the present embodiment, it is possible to prevent precipitations, such as calcium fluoride, from adhering to the glass surface during etching. In other words, by employing the glass composition of the present embodiment, the cover glass can be shape-processed quickly, and with high accuracy, by a simpler method.

The glass substrate of the present embodiment has an etching characteristic in which the etching rate is at least 3.7 μm/minute in an etching environment having a temperature of 22° C. and containing hydrogen fluoride with a concentration of 10% by mass. The above etching characteristic can be achieved by adjusting the composition of the glass substrate in a manner such that, if the content of the aforementioned $SiO_2$ is X % and the content of the aforementioned $Al_2O_3$ is Y %, X-½·Y is 57.5% or less.

The above method gives an example of performing shape-processing on the glass substrate by using only chemical etching, but the present embodiment is not limited thereto. For example, the shape-processing on the glass substrate may be performed by using chemical etching and machining in combination. For example, after shape-processing by etching, there may be a step of grinding or polishing some sections (the end surfaces, edges, etc.) of the glass substrate. Alternatively, prior to shape-processing by etching, there may be a step of cutting the glass substrate in advance by machining or a step of performing rough shape-processing.

The glass substrate of the present embodiment can also be suitably used in cases where an etching step is provided with the aim of removing cracks from the end surfaces of the glass substrate. This is because chemical substances, such as fluorine compounds, can precipitate in the etchant and deteriorate the etching accuracy and/or etching rate not only in cases where the glass substrate is subjected to shape-processing, but also in an etching step having the aim of removing cracks from the end surfaces of the glass substrate. In other words, the glass substrate of the present embodiment can suitably be used in cases that involve a processing step employing at least chemical etching. For example, the glass substrate of the present embodiment can suitably be used in such processing methods as described in (a) to (e) below that involve a shape-processing step and a step of removing cracks in the end surfaces of the glass substrate.

(a) A processing method involving: shape-processing by forming a resist film and sand-blasting thereon; then shape-processing the outer peripheral sections with diamond and other grindstones; and then removing remaining cracks on the processed surfaces by etching the glass substrate.

(b) A processing method involving: bonding a protective film on the principal surface of the glass; machining (e.g., cutting, shape-processing, boring) the glass; and then removing microcracks by etching the outer peripheral sections.

(c) A processing method involving: shape-processing by grinding and polishing; and then removing remaining cracks by etching the entire glass substrate (including the principal surfaces and end surfaces thereof).

(d) A processing method involving: bonding two sheets of machined glass substrates together with a hot-melt wax or a UV-curable resin; and then removing remaining cracks by chemically etching the exposed outer peripheral sections.

(e) A processing method involving: laminating and bonding together a plurality of sheets of glass substrates with a hot-melt wax or a UV-curable resin; cutting the block consisting of the glass substrates and processing the outer periphery thereof; and then removing remaining cracks by chemically etching the processed surfaces (outer-peripheral end surfaces) that are exposed from the block.

Step (4):

Step (4) is the step of subjecting the glass substrate shape-processed in Step (3) to an ion-exchange process.

The cover glass according to the present embodiment is produced by performing an ion-exchange process on the glass substrate that has been shape-processed in Step (3) as described above. More specifically, for example, after being rinsed, the glass substrate is immersed for around 1 to 25 hours in a treatment bath containing 100% of $KNO_3$ and kept at around 350° C. to 550° C., to thereby exchange the $Na^+$ ions on the superficial layer of the glass with $K^+$ ions present in the treatment bath. In this way, the glass substrate can be chemically strengthened. Note that the temperature, the length of time, the ion-exchange salt, etc., for the ion-exchange process can be changed as appropriate. For example, the ion-exchange salt may be a mixture containing two or more types of compounds, such as a mixed salt of $KNO_3$ and $NaNO_3$.

Characteristics of Glass Substrate:

Next, the characteristics of the glass substrate to be used for the cover glass 10, 100 of the first and second embodiments will be described.

Etching Rate:

The glass substrate to be used for the cover glass 10, 100 of the first and second embodiments has an etching rate of 3.7 μm/minute or greater, preferably 4.3 μm/minute or greater, more preferably 4.5 μm/minute or greater, and particularly preferably 5 μm/minute or greater, as measured according to the method described below. By setting the etching rate within the aforementioned range, the rate for shape-processing the glass and the rate for processing the end surfaces by etching can be increased, and the ability to produce the cover glass 10, 100 can be improved. Although the ability to produce the cover glass 10, 100 is improved with the increase in etching rate, increasing the content by percentage of $Al_2O_3$ to increase the etching rate will also increase the devitrification temperature. So, in order to achieve both devitrification resistance and an improvement in etching rate, it is preferable that the glass constituting the glass substrate of the present embodiment has an etching rate of 10 μm/minute or less, more preferably 8 μm/minute or less, and even more preferably 7 μm/minute or less. Specifically, the etching rate is preferably 3.7 μm/minute to 10 μm/minute, more preferably 4.3 μm/minute to 10 μm/minute, even more preferably 4.5 μm/minute to 8 μm/minute, and particularly preferably 5 μm/minute to 7 μm/minute.

The etching rate is found by measuring the etching amount (the change in thickness) for when etching is conducted for 20 minutes in an etching environment having a temperature of 22° C. and containing hydrogen fluoride with a concentration of 10% by mass.

Density:

The glass substrate to be used for the cover glass 10, 100 of the first and second embodiments has a density of preferably 2.8 $g/cm^3$ or less, more preferably 2.7 $g/cm^3$ or less, even more preferably 2.6 $g/cm^3$ or less, further more preferably 2.55 $g/cm^3$ or less, and particularly preferably 2.5 $g/cm^3$ or less. The smaller the density of the glass, the more lightweight the glass can be made, and lightweight glass can suitably be used as cover glasses, touch-panel display substrates, and the like.

Linear Thermal Expansion Coefficient:

The glass substrate to be used for the cover glass 10, 100 of the first and second embodiments has a linear thermal expansion coefficient of preferably from $50 \times 10^{-7}$ to $120 \times 10^{-7}/°$ C., more preferably from $60 \times 10^{-7}$ to $120 \times 10^{-7}/°$ C., even more preferably from $70 \times 10^{-7}$ to $110 \times 10^{-7}/°$ C., and particularly preferably from $80 \times 10^{-7}$ to $110 \times 10^{-7}/°$ C., within the temperature range of 100° C. to 300° C. By setting the linear thermal expansion coefficient of the glass within the range of $50 \times 10^{-7}$ to $120 \times 10^{-7}/°$ C. in the temperature range of 100° C. to 300° C., the coefficient of thermal expansion will likely match the coefficients of thermal expansion of peripheral materials, such as metals and organic adhesives, and thus the peripheral materials can be prevented from peeling.

Devitrification Temperature (Tl):

The glass substrate to be used for the cover glass 10, 100 of the first and second embodiments has a devitrification temperature of preferably 1200° C. or less, more preferably 1100° C. or less, even more preferably 1000° C. or less, and particularly preferably 960° C. or less. The lower the devitrification temperature is, the more the devitrification of glass during production can be prevented. In other words, lower devitrification temperatures can improve devitrification resistance, and the glass becomes more suitable for down-draw processing and can be formed at lower temperatures, which thus allows the reduction of glass production costs. Also, lower devitrification temperatures can improve the formability of glass. Note that "devitrification resistance" as used herein is a characteristic that uses the devitrification temperature as its index: the lower the devitrification temperature, the higher the devitrification resistance.

Glass Transition Temperature (Tg):

The glass substrate to be used for the cover glass 10, 100 of the first and second embodiments has a glass transition temperature Tg of 500° C. or higher, preferably 510° C. or higher, more preferably 530° C. or higher, even more preferably 560° C. or higher, further more preferably 580° C. or higher, and particularly preferably 590° C. or higher. By setting Tg to 500° C. or higher, it is possible to prevent the heat resistance from deteriorating and the strengthening layer, which is formed on the principal surfaces and the end surfaces of the glass substrate by ion-exchange processing, from causing stress relaxation. Further, setting Tg to 500° C. or higher can inhibit the deformation of the glass substrate and the chemically-strengthened glass substrate during thermal treatments, but if Tg reaches 700° C. or higher, the ion-exchange performance will drop. Therefore, Tg is preferably 700° C. or lower, more preferably 650° C. or lower, and even more preferably 620° C. or lower. Specifically, Tg is preferably 500° C. to 700° C., preferably 510° C. to 700° C., more preferably 530° C. to 650° C., even more preferably 560° C. to 650° C., further more preferably 580° Co 650° C., and particularly preferably 590° C. to 620° C.

Further, the smaller the difference between the devitrification temperature and the glass transition point is, the more the devitrification of glass during production can be prevented (the more the devitrification resistance can be improved). That is, the smaller the difference between the devitrification temperature and the glass transition point is, the more the devitrification resistance can be improved, and the glass becomes more suitable for down-draw processing and the glass substrate can be formed at lower temperatures, which thus allows the reduction of glass production costs. Therefore, in the glass substrate to be used for the cover glass 10, 100 of the present embodiment, the difference "Tl–Tg" is preferably 500° C. or less, more preferably 450° C. or less, even more preferably 400° C. or less, further more preferably 380° C. or less, and particularly preferably 370° C. or less. By setting the difference "Tl–Tg" to 500° C. or less, the formability of the glass substrate can be improved.

High-Temperature Viscosity:

The glass substrate to be used for the cover glass 10, 100 of the first and second embodiments has a high-temperature viscosity (temperature at 200 dPa·s) of preferably 1700° C. or lower, more preferably 1600° C. or lower, even more preferably 1550° C. or lower, and particularly preferably 1520° C. or lower. By setting the high-temperature viscosity of the glass substrate to 1700° C. or lower, it is possible to prevent an increase in melting temperature as well as an increase in thermal load on the glass-production facility, such as the melting furnace. The bubble quality (the content of bubbles) of the glass can also be improved. Thus, glass can be produced inexpensively.

Strain Point:

The glass substrate to be used for the cover glass 10, 100 of the first and second embodiments has a strain point of preferably 460° C. or higher, more preferably 470° C. or higher, even more preferably 490° C. or higher, further more preferably 520° C. or higher, and particularly preferably 560° C. or higher. By setting the strain point to 460° C. or higher, it is possible to prevent the heat resistance from deteriorating and the strengthening layer, which is formed on the principal surfaces and the end surfaces of the glass substrate by ion-exchange processing, from causing stress relaxation. Note that, although setting the strain point to 460° C. or higher can inhibit the deformation of the glass substrate and the chemically-strengthened glass substrate during thermal treatments, if the strain point reaches 660° C. or higher, the ion-exchange performance will drop. Therefore, the strain point is preferably 660° C. or lower, more preferably 610° C. or lower, and even more preferably 580° C. or lower. Specifically, the strain point is preferably 460° C. to 660° C., more preferably 470° C. to 660° C., even more preferably 490° C. to 610° C., further more preferably 520° C. to 610° C., and particularly preferably 560° C. to 580° C.

Thickness:

The glass substrate to be used for the cover glass 10, 100 of the first and second embodiments has a thickness of preferably 3.0 mm or less, more preferably 2.0 mm or less, even more preferably 1.3 mm or less, further more preferably 0.8 mm or less, and particularly preferably 0.6 mm or less. The thinner the glass substrate and the chemically-strengthened glass plate are, the more the cover glasses 10, 100 can be made lightweight, which makes them suitable for cover glasses, touch-panel display substrates, and the like. Note that, in consideration of the flexure, rigidity, strength, etc., of the glass substrate, the thickness is preferably 0.2 mm or greater, more preferably 0.3 mm or greater, and even more preferably 0.4 mm or greater. Meanwhile, chemically-strengthened glass that has been subjected to ion-exchange processing is less prone to break even when the thickness is small. For example, by forming the glass substrate by a down-draw process, it is possible to produce a thin glass substrate with high mechanical strength and excellent surface accuracy, even without polishing etc. Specifically, the thickness of the glass substrate and the thickness of the chemically-strengthened glass plate are preferably 0.2 mm to 2.0 mm, more preferably 0.2 mm to 1.3 mm, even more preferably 0.4 mm to 1.3 mm, further more preferably 0.4 mm to 0.8 mm, and particularly preferably 0.4 mm to 0.6 mm.

Compressive-Stress Value:

The glass substrate to be used for the cover glass 10, 100 of the first and second embodiments has a compressive-stress layer having a compressive-stress value of preferably 140 MPa or greater, more preferably 300 MPa or greater, more preferably 400 MPa or greater, even more preferably 500 MPa or greater, and further more preferably 600 MPa or greater. By setting the compressive-stress value to 300 MPa or greater, the cover glasses 10, 100 can be provided with sufficient strength to protect displays, for example. Note that, although an increase in the compressive-stress value will improve the glass strength, this will also increase the impact occurring when the strengthened glass is damaged. Therefore, in order to prevent any accidents caused by the impact, it is preferable that the chemically-strengthened cover glass 10, 100 of the present embodiment has a compressive-stress value of 950 MPa or less, more preferably 800 MPa or less, more preferably 750 MPa or less, and even more preferably 700 MPa or less. Specifically, the compressive-stress value of the glass constituting the chemically-strengthened glass substrate and the cover glass of the present embodiment is preferably 300 MPa to 950 MPa, more preferably 400 MPa to 900 MPa, even more preferably 400 MPa to 800 MPa, and even further preferably 500 MPa to 800 MPa.

Compressive Layer Depth:

The compressive layer depth of the glass constituting the chemically-strengthened glass substrate and the cover glass of the present embodiment is 15 µm to 90 µm, preferably 20 µm to 85 µm, more preferably 25 µm to 80 µm, even more preferably 30 µm to 70 µm, and even further preferably 30 µm to 50 µm.

Note that there has been a tendency to reduce the plate thickness of the cover glass in recent years in order to reduce the weight, and although this is accompanied by a reduction in the compressive layer depth, there is a demand for having a compressive stress value that is a predetermined value or greater. Specifically, it is preferable that the plate thickness of the cover glass is 0.2 mm to 1.3 mm, the compressive layer depth is 20 µm to 85 µm, and the compressive stress value is 300 MPa to 950 MPa; it is more preferable that the plate thickness of the cover glass is 0.4 mm to 1.3 mm, the compressive layer depth is 25 µm to 80 µm, and the compressive stress value is 400 MPa to 900 MPa; it is even more preferable that the plate thickness of the cover glass is 0.4 mm to 0.8 mm, the compressive layer depth is 30 µm to 70 µm, and the compressive stress value is 400 MPa to 800 MPa; and it is even more preferable that the plate thickness of the cover glass is 0.4 mm to 0.6 mm, the compressive layer depth is 30 µm to 50 µm, and the compressive stress value is 500 MPa to 800 MPa.

EXAMPLES

Now, the present invention will be described in further detail below according to Examples thereof. The present invention, however, is not to be limited to the following Examples.

Preparation of Glass According to First Embodiment

First, glass materials (batches) were prepared by using general glass materials, i.e., silica, alumina, sodium sulfate, lithium carbonate, sodium carbonate, potassium carbonate, basic magnesium carbonate, calcium carbonate, tin dioxide, and zirconium oxide, so as to provide the glass compositions as shown in Tables 1 and 2 (Samples 1 to 28) and Tables 3 and 4 (Samples 29 to 33). Each prepared batch was heated in an electric furnace for 4 hours at 1550° C. with a platinum crucible and was made into molten glass, and then, outside the furnace, the molten glass was spread out onto an iron plate to cool, to thereby prepare a block of glass. The glass block was kept in an electric furnace for 30 minutes at 600° C., then the furnace was turned off, and the glass block was gradually cooled to room temperature. The prepared glass block was employed as the glass sample for evaluating the physical properties of the glass.

For each glass sample prepared as above, the devitrification temperature, the strain point, the coefficient of thermal expansion, the glass transition temperature, the high-temperature viscosity, and the etching rate were evaluated.

TABLE 1

| | | SiO$_2$ | Al$_2$O$_3$ | Li$_2$O | Na$_2$O | K$_2$O | MgO | CaO | ZrO$_2$ | SnO$_2$ | SO$_3$ |
|---|---|---|---|---|---|---|---|---|---|---|---|
| | | | | | Glass composition (mass %) | | | | | | |
| Sample | 1 | 62.6 | 17.4 | | 15.4 | | 1.9 | 2.6 | | | 0.1 |
| | 2 | 62.8 | 14.7 | | 15.8 | | 2.2 | 3.2 | 1.2 | | 0.1 |
| | 3 | 60.2 | 13.1 | | 14.5 | 3.3 | 2.2 | 3.2 | 3.4 | | 0.1 |
| | 4 | 62.4 | 13.1 | | 14.5 | 3.3 | 2.2 | 3.2 | 1.2 | 0.1 | |
| | 5 | 60.8 | 14.7 | | 14.5 | 3.3 | 2.2 | 3.2 | 1.2 | 0.1 | |
| | 6 | 61.3 | 12.8 | | 12.9 | 3.3 | 2.2 | 3.2 | 4.2 | 0.1 | |
| | 7 | 56.0 | 17.3 | | 14.5 | 3.3 | 2.2 | 3.2 | 3.4 | 0.1 | |
| | 8 | 58.0 | 15.3 | | 14.5 | 3.3 | 2.2 | 3.2 | 3.4 | 0.1 | |
| | 9 | 62.0 | 11.3 | | 14.5 | 3.3 | 2.2 | 3.2 | 3.4 | 0.1 | |
| | 10 | 60.2 | 13.1 | | 14.5 | 3.3 | 3.9 | 1.5 | 3.4 | 0.1 | |
| | 11 | 54.0 | 19.3 | | 14.5 | 3.3 | 2.2 | 3.2 | 3.4 | 0.1 | |
| | 12 | 62.1 | 12.8 | | 15.5 | 3.2 | 6.3 | | | | 0.1 |
| | 13 | 60.9 | 12.1 | | 17.7 | 3.1 | 4.1 | | 2.0 | | 0.1 |
| | 14 | 59.7 | 11.8 | | 17.4 | 3.1 | 4.0 | | 3.8 | 0.1 | |
| | 15 | 61.0 | 10.9 | | 17.7 | 6.3 | 2.1 | | 2.0 | 0.1 | |
| | 16 | 59.8 | 10.7 | | 17.4 | 6.2 | 2.0 | | 3.8 | 0.1 | |
| | 17 | 59.9 | 10.5 | | 12.4 | 9.2 | 4.0 | | 3.8 | 0.1 | |
| | 18 | 62.0 | 13.0 | | 20.7 | | 4.2 | | | | 0.1 |
| | 19 | 62.0 | 13.3 | | 19.4 | | 5.3 | | | 0.1 | |
| | 20 | 62.1 | 12.9 | | 18.1 | 1.6 | 5.3 | | | 0.1 | |
| | 21 | 60.9 | 13.0 | | 12.8 | 7.9 | 5.2 | | | 0.1 | |
| | 22 | 60.9 | 12.0 | | 15.2 | 4.7 | 5.1 | | 2.0 | 0.1 | |
| | 23 | 61.5 | 14.0 | | 15.3 | 3.8 | 5.2 | | | | 0.1 |
| | 24 | 60.8 | 13.7 | | 15.4 | 4.8 | 5.2 | | | 0.1 | |
| | 25 | 60.1 | 14.5 | | 15.3 | 4.8 | 5.2 | | | | 0.1 |
| | 26 | 62.0 | 14.1 | | 14.9 | 3.8 | 5.2 | | | 0.1 | |
| | 27 | 62.2 | 14.1 | | 15.3 | 3.1 | 5.2 | | | 0.1 | |
| | 28 | 61.9 | 14.0 | | 15.3 | 3.8 | 4.9 | | | | |

TABLE 2

| | | | | Glass composition (%) | | |
|---|---|---|---|---|---|---|
| | | RO | SiO$_2$-1/2Al$_2$O$_3$ | B$_2$O$_3$/R$^1_2$O | (ZrO$_2$ + TiO$_2$)/SiO$_2$ | Li$_2$O/(RO + Li$_2$O) |
| Sample | 1 | 4.5 | 53.9 | 0 | 0 | 0 |
| | 2 | 5.4 | 55.5 | 0 | 0.019 | 0 |
| | 3 | 5.4 | 53.7 | 0 | 0.056 | 0 |
| | 4 | 5.4 | 55.9 | 0 | 0.019 | 0 |
| | 5 | 5.4 | 53.5 | 0 | 0.020 | 0 |
| | 6 | 5.4 | 53.7 | 0 | 0.080 | 0 |
| | 7 | 5.4 | 47.4 | 0 | 0.061 | 0 |
| | 8 | 5.4 | 50.4 | 0 | 0.059 | 0 |
| | 9 | 5.4 | 56.4 | 0 | 0.055 | 0 |
| | 10 | 5.4 | 53.7 | 0 | 0.056 | 0 |
| | 11 | 5.4 | 44.4 | 0 | 0.063 | 0 |
| | 12 | 6.3 | 55.7 | 0 | 0 | 0 |
| | 13 | 4.1 | 54.9 | 0 | 0.032 | 0 |
| | 14 | 4.0 | 53.8 | 0 | 0.064 | 0 |
| | 15 | 2.1 | 55.5 | 0 | 0.032 | 0 |

TABLE 2-continued

| | | | | Glass composition (%) | | |
|---|---|---|---|---|---|---|
| | | RO | SiO$_2$-1/2Al$_2$O$_3$ | B$_2$O$_3$/R$^1_2$O | (ZrO$_2$ + TiO$_2$)/SiO$_2$ | Li$_2$O/(RO + Li$_2$O) |
| | 16 | 2.0 | 54.5 | 0 | 0.064 | 0 |
| | 17 | 4.0 | 54.7 | 0 | 0.064 | 0 |
| | 18 | 4.2 | 55.5 | 0 | 0 | 0 |
| | 19 | 5.3 | 55.4 | 0 | 0 | 0 |
| | 20 | 5.3 | 55.6 | 0 | 0 | 0 |
| | 21 | 5.2 | 54.4 | 0 | 0 | 0 |
| | 22 | 5.1 | 55.0 | 0 | 0.032 | 0 |
| | 23 | 5.2 | 54.5 | 0 | 0 | 0 |
| | 24 | 5.2 | 53.9 | 0 | 0 | 0 |
| | 25 | 5.2 | 52.9 | 0 | 0 | 0 |
| | 26 | 5.2 | 55.0 | 0 | 0 | 0 |
| | 27 | 5.2 | 55.1 | 0 | 0 | 0 |
| | 28 | 4.9 | 54.9 | 0 | 0 | 0 |

TABLE 3

| | | SiO$_2$ | Al$_2$O$_3$ | Li$_2$O | Na$_2$O | K$_2$O | MgO | CaO | ZrO$_2$ | SnO$_2$ | SO$_3$ |
|---|---|---|---|---|---|---|---|---|---|---|---|
| | | | | | Glass composition (mass %) | | | | | | |
| Sample | 29 | 65 | 8.3 | | 14.5 | 3.3 | 2.2 | 3.2 | 3.4 | | 0.1 |
| | 30 | 67 | 6.3 | | 14.5 | 3.3 | 2.2 | 3.2 | 3.4 | | 0.1 |
| | 31 | 63.2 | 10.1 | | 14.5 | 3.3 | 2.2 | 3.2 | 3.4 | | 0.1 |
| | 32 | 63.7 | 9.7 | | 14.5 | 3.3 | 2.2 | 3.2 | 3.4 | | 0.1 |
| | 33 | 63.5 | 8.0 | 7.8 | 10.2 | | | | 11.2 | | |

TABLE 4

| | | Glass composition (%) | | | | |
|---|---|---|---|---|---|---|
| | | RO | $SiO_2$-1/ $2Al_2O_3$ | $B_2O_3/R^1_2O$ | $(ZrO_2 + TiO_2)/SiO_2$ | $Li_2O/ (RO + Li_2O)$ |
| Sample | 29 | 5.4 | 60.9 | 0 | 0.052 | 0 |
| | 30 | 5.4 | 63.9 | 0 | 0.051 | 0 |
| | 31 | 5.4 | 58.1 | 0 | 0.054 | 0 |
| | 32 | 5.4 | 58.9 | 0 | 0.053 | 0 |
| | 33 | 0 | 59.5 | 0 | 0.176 | 1 |

Evaluation of Devitrification Temperature:

The glass sample was pulverized, and glass particles that passed through a 2380-μm sieve but remained on a 1000-μm sieve were immersed into ethanol, subjected to ultrasonic cleaning, and then dried in a constant-temperature oven. Then, 25 g of the glass particles were placed on a 12-by-200-by-10-mm platinum board so that they assume a substantially constant thickness, and were placed in an electric furnace having a temperature gradient from 800° C. to 1200° C. and kept therein for 24 hours. Then, the particles were taken out from the furnace, and devitrification that occurred inside the glass was observed with an optical microscope at a magnification of 40 times. The maximum temperature at which devitrification was observed was found as the devitrification temperature.

Evaluation of Strain Point:

The glass sample was cut out into a 3-by-3-by-55-mm right square prism and was ground, and the strain point (Ps) thereof was measured with a beam bending viscometer (product of Tokyo Kogyo Co., Ltd.). The strain point was found by calculation according to the beam bending method (ASTM C-598).

Evaluation of Coefficient of Thermal Expansion and Glass Transition Temperature (Tg):

The glass sample was processed into a circular cylinder 5 mm in diameter and 20 mm long, and the coefficient of thermal expansion and the glass transition temperature (Tg) were measured with a differential dilatometer (Thermo Plus2 TMA8310). The average thermal expansion coefficient in the temperature range of 100° C. to 300° C. was calculated from the results of measuring the thermal expansion coefficient.

Evaluation of Density:

The density was measured according to the Archimedean method.

Evaluation of High-Temperature Viscosity:

The glass sample was molten for 4 hours at 1600° C. and bubbles were removed therefrom, and the high-temperature viscosity was measured with a pull-down automatic viscometer. More specifically, the viscosity of the sample was found by suspending a platinum ball down into the molten glass sample, pulling down the sample and the container containing the same, and measuring the viscous drag applied on the ball as the sample and the container were pulled down, as the load. Tables 5 and 6 show the temperature for when the glass viscosity was 200 dPa·s.

Evaluation of Etching Rate:

The glass sample was cut into a size 20 to 50 mm long, 20 to 40 mm wide, and 0.7 mm thick and was ground and polished, to prepare a sample sheet. After being rinsed, the sample sheet was immersed for 20 minutes in 400 mL of HF (concentration: 10% by mass; temperature: 22° C.) held in a container. After rinsing the sample sheet with water, the thickness and mass of the sample were measured and compared with those measured prior to the test, to calculate the etching rate of the glass sample.

Chemical Strengthening:

The sample sheet, after being rinsed, was immersed for about 2.5 hours in a treatment bath containing 100% of $KNO_3$ kept at 400° C., to exchange the $Na^+$ ions on the superficial layer of the glass with $K^+$ ions present in the treatment bath and thereby chemically strengthen the glass sample. The chemically-strengthened glass substrate was immersed in a rinsing tank for rinsing and then dried, to thereby obtain a piece of strengthened glass. As for Samples 4, 7, 9, and 10, each glass sample was chemically strengthened by being immersed for about 5 hours in a treatment bath containing 100% of $KNO_3$ kept at 500° C.

Evaluation of Compressive-Stress Value:

The strengthened glass obtained as above was observed to find the number of interference fringes and the interval therebetween with a surface stress meter (Luceo FSM-6000LE), and the compressive-stress value of the compressive-stress layer formed in the vicinity of the surface of the glass and the thickness of the compressive-stress layer were calculated. In the calculation, the refractive index (nd) of each sample was regarded as 1.50, and the stress optical coefficient was regarded as 28 ((nm/cm)/MPa). As for samples 4, 7, 9, and 10, the refractive index (nd) of each sample was regarded as 1.52.

Tables 5 and 6 show the characteristics of Samples 1 to 28 of the first embodiment shown in Tables 1 and 2 and those of Samples 29 to 33 of the first embodiment shown in Tables 3 and 4.

TABLE 5

| | | Glass characteristics | | | | | | | | |
|---|---|---|---|---|---|---|---|---|---|---|
| | | Tl (° C.) | High-temp viscosity (° C.) | Strain point (° C.) | Etching rate (μm/min) | Tg (° C.) | Avg. thermal expansion coef. [×$10^{-7}$/° C.] | Tl − Tg (° C.) | Density (g/cm$^3$) | Compressive stress value (MPa) | Surface compressive layer depth (μm) |
| Sample | 1 | 1000 | | 563 | 5.1 | 610 | 89 | 390 | 2.46 | | |
| | 2 | 1021 | | 558 | 4.5 | 604 | 89 | 417 | 2.49 | | |
| | 3 | 948 | 1508 | 563 | 5.2 | 593 | 95 | 355 | 2.52 | 659 | 40 |
| | 4 | 927 | | 532 | 4.3 | 578 | 97 | 349 | 2.49 | | |
| | 5 | 988 | | 545 | 5.3 | 592 | 97 | 396 | 2.49 | | |
| | 6 | 1003 | 1542 | 582 | 5.2 | 616 | 90 | 387 | 2.54 | 768 | 35 |
| | 7 | 1018 | | 583 | 6.1 | 626 | 91 | 392 | 2.53 | | |
| | 8 | 1003 | | 570 | 6.1 | 614 | 91 | 389 | 2.53 | 864 | 41 |
| | 9 | 968 | | 537 | 4.1 | 586 | 91 | 382 | 2.51 | 707 | 36 |
| | 10 | 1112 | | 579 | 5.2 | 620 | 91 | 492 | 2.50 | | |

TABLE 5-continued

| | | Tl (° C.) | High-temp viscosity (° C.) | Strain point (° C.) | Etching rate (μm/min) | Tg (° C.) | Avg. thermal expansion coef. [×10⁻⁷/° C.] | Tl – Tg (° C.) | Density (g/cm³) | Compressive stress value (MPa) | Surface compressive layer depth (μm) |
|---|---|---|---|---|---|---|---|---|---|---|---|
| | 11 | 1200 | | 587 | 4.8 | 636 | 92 | 564 | | | |
| | 12 | 1090 | | | 3.7 | 585 | 99.7 | 505 | 2.455 | 693 | 47 |
| | 13 | <840 | | | 4.0 | 559 | 106 | <300 | 2.480 | 543 | 57 |
| | 14 | <840 | | | 4.6 | 579 | 97.9 | <300 | 2.510 | 684 | 53 |
| | 15 | <840 | | | 3.7 | 511 | 114 | <329 | 2.477 | 147 | 88 |
| | 16 | <840 | | | 4.2 | 527 | 113 | <313 | 2.506 | 236 | 83 |
| | 17 | <840 | | | 4.1 | 572 | 106 | <300 | 2.502 | 587 | 66.8 |
| | 18 | <840 | | | 3.7 | 551 | 102.7 | <300 | 2.460 | 354 | 53.4 |
| | 19 | <840 | | | 3.8 | 574 | 99.5 | <300 | 2.457 | 524 | 47.7 |
| | 20 | <840 | | | 3.7 | 566 | 102.7 | <300 | 2.453 | 576 | 49.4 |
| | 21 | <840 | | | 4.2 | 570 | 105 | <300 | 2.449 | 584 | 65 |
| | 22 | <840 | | | 3.9 | 581 | 102.6 | <300 | 2.487 | | |
| | 23 | 907 | | | 4.2 | 574 | 104 | 333 | 2.459 | | |
| | 24 | <840 | | | 4.5 | 572 | 103.6 | <300 | 2.463 | | |
| | 25 | 953 | | | 5.2 | 577 | 105 | 376 | 2.465 | | |
| | 26 | <840 | | | 3.9 | | | <300 | | | |
| | 27 | <840 | | | 3.9 | | | <300 | | | |
| | 28 | <840 | | | 4.0 | | | <300 | | | |

TABLE 6

| | | Tl (° C.) | High-temp. viscosity (° C.) | Strain point (° C.) | Etching rate (μm/min) | Tg (° C.) | Avg. thermal expansion [×10⁻⁷/° C.] | Tl – Tg (° C.) | Density (g/cm³) |
|---|---|---|---|---|---|---|---|---|---|
| Sample | 29 | 858 | | 513 | 2.3 | 563 | 90 | 295 | 2.51 |
| | 30 | 830 | | 504 | 1.7 | 554 | 90 | 276 | 2.50 |
| | 31 | 855 | | 530 | 3.4 | 576 | 90 | 279 | 2.51 |
| | 32 | 836 | | 527 | 2.8 | 571 | 90 | 265 | 2.51 |
| | 33 | | | 524 | 3.5 | 570 | | | |

Figure 3:
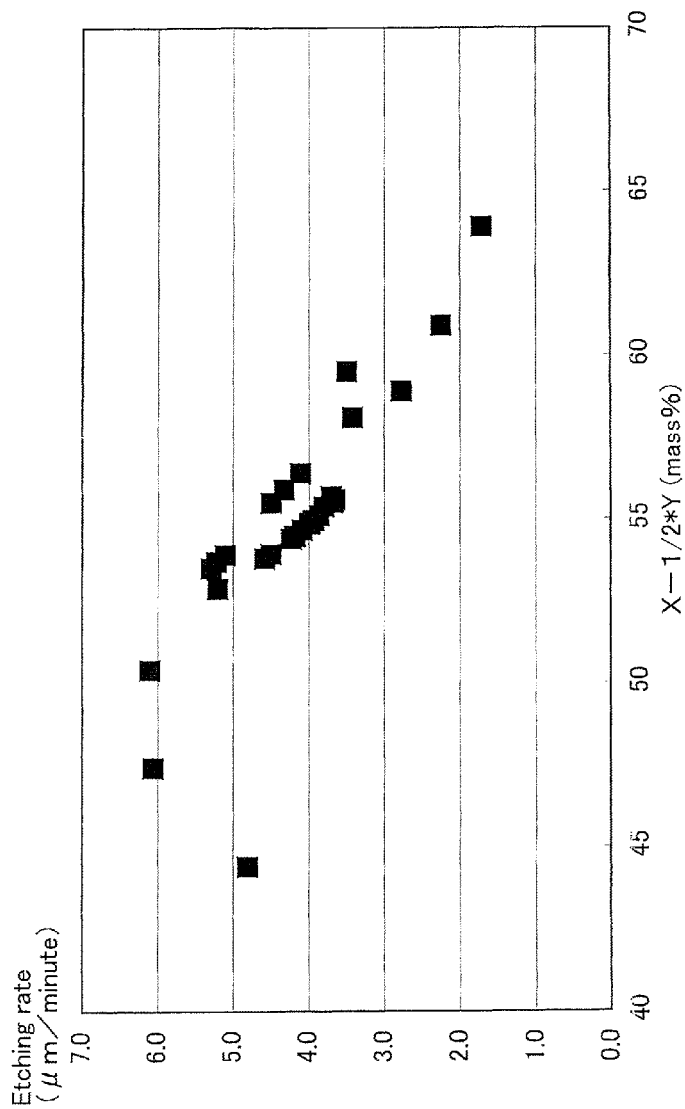
FIG. 3 is a chart illustrating the relationship between various glass compositions and etching rates according to the first embodiment.

FIG. 3 shows a distribution chart showing the etching rates given on Tables 5 and 6 on the Y-axis and the aforementioned X-½·Y (wherein X is the content by percentage of $SiO_2$ and Y is the content by percentage of $Al_2O_3$) on the X-axis for Samples 1 to 28 in Tables 1 and 2 and Samples 29 to 33 in Tables 3 and 4. As can be seen, the etching rate increases as the value of X-½·Y decreases. Meanwhile, no significant change in the etching rate can be seen in the area where X-½·Y is 52% or less. So, in order to achieve an etching rate of 3.7 μm/minute or greater, it is preferable that X-½·Y is 57.5% or less. However, even if the value of Y is increased and X-½·Y is adjusted to 52% or less, there will be no further increase in the etching rate, and in addition, the devitrification temperature will increase and thus the devitrification resistance will deteriorate. Therefore, the lower limit of the value of X-½·Y is preferably 45%.

Example of Continuous Production of Glass Substrate:

Glass materials were prepared so as to provide a glass substrate with the composition shown in Sample 4 (see Tables 1 and 2). The glass materials were molten at 1520° C. by using a continuous melting device having, for example, a fire-brick-made melting tank, a platinum-made stirring tank and so on, were subjected to refining at 1550° C., stirred at 1350° C., and then formed into a thin plate 0.7 mm thick by down-draw processing, to produce a glass substrate for chemical strengthening. Etching and chemical strengthening were performed as follows.

The glass substrate prepared as above was employed as the sample glass substrate, and a 20-μm-thick pattern made of a phenolic heat-curable resin and having the shape of a cover glass was formed on each of the principal surfaces of the substrate by mesh-screen printing, and the phenolic heat-curable resin patterns were baked for 15 minutes at 200° C. With the phenolic heat-curable resin patterns being employed as masks, the glass sample was etched in the regions-to-be-etched from both principal surfaces by using a mixed-acid aqueous solution (40° C.) containing hydrofluoric acid (15% by mass) and sulfuric acid (24% by mass) as the etchant, to cut the glass sample into a predetermined shape. Then, the phenolic heat-curable resin remaining on the glass was dissolved by using an NaOH solution and was removed off from the glass, and then the glass was rinsed.

Then, the rinsed sample glass substrate was immersed for about 5 hours in a treatment bath containing 100% of $KNO_3$ kept at 500° C., to exchange the Na ions on the superficial layer of the glass with K ions present in the treatment bath and thereby chemically strengthen the glass sample. The chemically-strengthened sample glass substrate was immersed in a rinsing tank for rinsing and then dried.

The result was that it was possible to produce a glass substrate having excellent quality and an improved etching rate of 3.7 μm/minute or higher.

Preparation of Glass According to Second Embodiment

First, glass materials (batches) were prepared by using general glass materials, i.e., silica, alumina, sodium sulfate, lithium carbonate, sodium carbonate, potassium carbonate, basic magnesium carbonate, calcium carbonate, tin dioxide, and zirconium oxide, so as to provide the glass compositions as shown in Tables 7 and 8 (Samples 34 to 62) and Tables 9 and 10 (Samples 63 to 76). Each prepared batch was heated in an electric furnace for 4 hours at 1550° C. with a platinum crucible and was made into molten glass, and then, outside the furnace, the molten glass was spread out onto an iron plate to cool, to thereby prepare a block of glass. The glass block was kept in an electric furnace for 30 minutes at 600° C., then the furnace was turned off, and the glass block was gradually cooled to room temperature. The cooled glass block was subjected to machining, such as cutting and polishing, and was made into a 50-by-40-mm glass sample approximately 0.7 mm thick. For each glass substrate prepared as above, the devitrification temperature (Tl), the etching rate, the glass transition temperature (Tg), the average linear thermal expansion coefficient, the density, the compressive-stress value, the surface compressive layer depth, and the processing accuracy were evaluated.

TABLE 7

| | | Glass composition (mass %) | | | | | | | | | |
|---|---|---|---|---|---|---|---|---|---|---|---|
| | | $SiO_2$ | $Al_2O_3$ | $Li_2O$ | $Na_2O$ | $K_2O$ | MgO | CaO | $ZrO_2$ | $SnO_2$ | $SO_3$ |
| Sample | 34 | 62.6 | 17.4 | | 15.4 | | 1.9 | 2.6 | | | 0.1 |
| | 35 | 60.2 | 13.1 | | 14.5 | 3.3 | 3.9 | 1.5 | 3.4 | 0.1 | |
| | 36 | 62.1 | 12.8 | | 15.5 | 3.2 | 6.3 | | | | 0.1 |
| | 37 | 60.9 | 12.1 | | 17.7 | 3.1 | 4.1 | | 2.0 | | 0.1 |
| | 38 | 59.7 | 11.8 | | 17.4 | 3.1 | 4.0 | | 3.8 | 0.1 | |
| | 39 | 61.0 | 10.9 | | 17.7 | 6.3 | 2.1 | | 2.0 | 0.1 | |
| | 40 | 59.8 | 10.7 | | 17.4 | 6.2 | 2.0 | | 3.8 | 0.1 | |
| | 41 | 59.9 | 10.5 | | 12.4 | 9.2 | 4.0 | | 3.8 | 0.1 | |
| | 42 | 62.0 | 13.0 | | 20.7 | | 4.2 | | | | 0.1 |
| | 43 | 62.0 | 13.3 | | 19.4 | | 5.3 | | | 0.1 | |
| | 44 | 62.1 | 12.9 | | 18.1 | 1.6 | 5.3 | | | 0.1 | |
| | 45 | 60.9 | 13.0 | | 12.8 | 7.9 | 5.2 | | | 0.1 | |
| | 46 | 60.9 | 12.0 | | 15.2 | 4.7 | 5.1 | | 2.0 | | 0.1 |
| | 47 | 61.5 | 14.0 | | 15.3 | 3.8 | 5.2 | | | | 0.1 |
| | 48 | 60.8 | 13.7 | | 15.4 | 4.8 | 5.2 | | | 0.1 | |
| | 49 | 60.1 | 14.5 | | 15.3 | 4.8 | 5.2 | | | | 0.1 |
| | 50 | 62.0 | 14.1 | | 14.9 | 3.8 | 5.2 | | | 0.1 | |
| | 51 | 62.2 | 14.1 | | 15.3 | 3.1 | 5.2 | | | 0.1 | |
| | 52 | 61.9 | 14.0 | | 15.3 | 3.8 | 4.9 | | | | |
| | 53 | 62.1 | 12.7 | | 19.4 | 1.6 | 4.2 | | | | 0.1 |
| | 54 | 62.2 | 12.2 | | 15.5 | 4.8 | 5.3 | | | | 0.1 |
| | 55 | 62.2 | 12.4 | | 14.7 | 4.8 | 5.9 | | | 0.1 | |
| | 56 | 62.1 | 12.7 | | 16.0 | 3.2 | 5.9 | | | 0.1 | |
| | 57 | 61.5 | 14.3 | | 15.3 | 3.2 | 5.6 | | | | 0.1 |
| | 58 | 61.5 | 14.0 | 0.001 | 15.4 | 3.8 | 5.2 | | | 0.1 | |
| | 59 | 61.5 | 14.0 | 0.01 | 15.4 | 3.8 | 5.2 | | | 0.1 | |
| | 60 | 61.5 | 14.0 | 0.04 | 15.4 | 3.8 | 5.2 | | | 0.1 | |
| | 61 | 61.5 | 14.0 | 0.10 | 15.4 | 3.8 | 5.2 | | | 0.1 | |
| | 62 | 61.3 | 14.0 | 0.4 | 15.4 | 3.8 | 5.2 | | | 0.1 | |

TABLE 8

| | | Glass composition | | | | |
|---|---|---|---|---|---|---|
| | | RO | $SiO_2$-1/ $2Al_2O_3$ | $B_2O_3/R^1_2O$ | $(ZrO_2 + TiO_2)/SiO_2$ | $Li_2O/ (RO + Li_2O)$ |
| Sample | 34 | 4.5 | 53.9 | 0 | 0.000 | 0 |
| | 35 | 5.4 | 53.7 | 0 | 0.056 | 0 |
| | 36 | 6.3 | 55.7 | 0 | 0 | 0 |
| | 37 | 4.1 | 54.9 | 0 | 0.032 | 0 |
| | 38 | 4.0 | 53.8 | 0 | 0.064 | 0 |
| | 39 | 2.1 | 55.5 | 0 | 0.032 | 0 |
| | 40 | 2.0 | 54.5 | 0 | 0.064 | 0 |
| | 41 | 4.0 | 54.7 | 0 | 0.064 | 0 |
| | 42 | 4.2 | 55.5 | 0 | 0 | 0 |
| | 43 | 5.3 | 55.4 | 0 | 0 | 0 |
| | 44 | 5.3 | 55.6 | 0 | 0 | 0 |
| | 45 | 5.2 | 54.4 | 0 | 0 | 0 |
| | 46 | 5.1 | 55.0 | 0 | 0.032 | 0 |
| | 47 | 5.2 | 54.5 | 0 | 0 | 0 |
| | 48 | 5.2 | 53.9 | 0 | 0 | 0 |
| | 49 | 5.2 | 52.9 | 0 | 0 | 0 |
| | 50 | 5.2 | 55.0 | 0 | 0 | 0 |
| | 51 | 5.2 | 55.1 | 0 | 0 | 0 |
| | 52 | 4.9 | 54.9 | 0 | 0 | 0 |
| | 53 | 4.2 | 55.7 | 0 | 0 | 0 |
| | 54 | 5.3 | 56.1 | 0 | 0 | 0 |
| | 55 | 5.9 | 56.0 | 0 | 0 | 0 |
| | 56 | 5.9 | 55.8 | 0 | 0 | 0 |
| | 57 | 5.6 | 54.3 | 0 | 0 | 0 |
| | 58 | 5.2 | 54.5 | 0 | 0 | 0.0002 |
| | 59 | 5.2 | 54.5 | 0 | 0 | 0.0019 |
| | 60 | 5.2 | 54.5 | 0 | 0 | 0.0076 |
| | 61 | 5.2 | 54.4 | 0 | 0 | 0.0189 |
| | 62 | 5.2 | 54.3 | 0 | 0 | 0.0714 |

TABLE 9

| | | Glass composition (mass %) | | | | | | | | |
|---|---|---|---|---|---|---|---|---|---|---|
| | | $SiO_2$ | $Al_2O_3$ | $Li_2O$ | $Na_2O$ | $K_2O$ | MgO | CaO | $ZrO_2$ | $SnO_2$ | $SO_3$ |
| Sample | 63 | 65.0 | 8.3 | | 14.5 | 3.3 | 2.2 | 3.2 | 3.4 | | 0.1 |
| | 64 | 67.0 | 6.3 | | 14.5 | 3.3 | 2.2 | 3.2 | 3.4 | | 0.1 |
| | 65 | 63.2 | 10.1 | | 14.5 | 3.3 | 2.2 | 3.2 | 3.4 | | 0.1 |
| | 66 | 63.7 | 9.7 | | 14.5 | 3.3 | 2.2 | 3.2 | 3.4 | | 0.1 |
| | 67 | 63.5 | 8.2 | 8.0 | 10.4 | | | | 11.9 | | |
| | 68 | 62.8 | 14.7 | | 15.8 | | 2.2 | 3.2 | 1.2 | | 0.1 |
| | 69 | 60.2 | 13.1 | | 14.5 | 3.3 | 2.2 | 3.2 | 3.4 | | 0.1 |
| | 70 | 62.4 | 13.1 | | 14.5 | 3.3 | 2.2 | 3.2 | 1.2 | 0.1 | |
| | 71 | 60.8 | 14.7 | | 14.5 | 3.3 | 2.2 | 3.2 | 1.2 | 0.1 | |
| | 72 | 61.3 | 12.8 | | 12.9 | 3.3 | 2.2 | 3.2 | 4.2 | 0.1 | |
| | 73 | 56.0 | 17.3 | | 14.5 | 3.3 | 2.2 | 3.2 | 3.4 | 0.1 | |
| | 74 | 58.0 | 15.3 | | 14.5 | 3.3 | 2.2 | 3.2 | 3.4 | 0.1 | |
| | 75 | 62.0 | 11.3 | | 14.5 | 3.3 | 2.2 | 3.2 | 3.4 | 0.1 | |
| | 76 | 54.0 | 19.3 | | 14.5 | 3.3 | 2.2 | 3.2 | 3.4 | 0.1 | |

TABLE 10

| | | Glass composition | | | | |
|---|---|---|---|---|---|---|
| | | RO | $SiO_2$-1/ $2Al_2O_3$ | $B_2O_3/R^1{}_2O$ | $(ZrO_2 + TiO_2)/SiO_2$ | $Li_2O/ (RO + Li_2O)$ |
| Sample | 63 | 5.4 | 60.9 | 0 | 0.052 | 0 |
| | 64 | 5.4 | 63.9 | 0 | 0.051 | 0 |
| | 65 | 5.4 | 58.2 | 0 | 0.054 | 0 |
| | 66 | 5.4 | 58.9 | 0 | 0.053 | 0 |
| | 67 | 0 | 59.4 | 0 | 0.176 | 1 |
| | 68 | 5.4 | 55.5 | 0 | 0.019 | 0 |
| | 69 | 5.4 | 53.7 | 0 | 0.056 | 0 |
| | 70 | 5.4 | 55.9 | 0 | 0.019 | 0 |
| | 71 | 5.4 | 53.5 | 0 | 0.020 | 0 |
| | 72 | 5.4 | 54.9 | 0 | 0.069 | 0 |
| | 73 | 5.4 | 47.4 | 0 | 0.061 | 0 |
| | 74 | 5.4 | 50.4 | 0 | 0.059 | 0 |
| | 75 | 5.4 | 56.4 | 0 | 0.055 | 0 |
| | 76 | 5.4 | 44.4 | 0 | 0.063 | 0 |

Evaluation of Devitrification Temperature:

The glass sample was pulverized, and glass particles that passed through a 2380-μm sieve but remained on a 1000-μm sieve were immersed into ethanol, subjected to ultrasonic cleaning, and then dried in a constant-temperature oven. Then, 25 g of the glass particles were placed on a 12-by-200-by-10-mm platinum board so that they assume a substantially constant thickness, and were placed in an electric furnace having a temperature gradient from 800° C. to 1200° C. and kept therein for 24 hours. Then, the particles were taken out from the furnace, and devitrification that occurred inside the glass was observed with an optical microscope at a magnification of 40 times. The maximum temperature at which devitrification was observed was found as the devitrification temperature.

Evaluation of Etching Rate:

The glass sample, after being rinsed, was immersed for 20 minutes in 400 mL of HF (concentration: 10% by mass; temperature: 22° C.) held in a container. After rinsing the sample with water, the thickness and mass of the sample were measured and compared with those measured prior to the test, to calculate the etching rate of the glass substrate.

Evaluation of Accuracy in Shape-Processing including Etching:

As illustrated in FIG. 4A, two sheets of glass 20, each of which being a machined glass substrate prior to chemical strengthening, were placed on top of one another, and three sheets of dummy glass 22 were placed on the respective sides of the two glasses 20, and the stack of glass sheets was etched. The etched end surfaces of the glass after etching were observed with an optical microscope.

The end surfaces were observed in two ways. Observation A was done by visually observing the end surface on the long side of the glass, as illustrated in FIG. 4A, at 200× magnification. Observation B was done by: first splitting the glass substrate in half at the center of the short side thereof along a line perpendicular to the short side; and then visually observing the end surface on the short side of the glass, as illustrated in FIG. 4B, at 200× magnification. The etching result was evaluated as "Good" if both Observations A and B showed that etching was achieved substantially evenly, was evaluated as "Fair" if only one of Observations A and B showed that etching was achieved substantially evenly and the other was uneven, and was evaluated as "Poor" if both Observations A and B showed that etching was uneven. For example, such sample images as those shown in FIG. 5A are evaluated as "Poor", while such sample images as those shown in FIG. 5B are evaluated as "Good". As for the sample images shown in FIG. 5A, the end surface of the glass has projections and recesses created by precipitations having precipitated on the end surface, and is thus not smooth. Thus, the sample images in FIG. 5A for Observation A, which were obtained with an optical microscope, show an intermixture of white regions created by specular reflection of light from the smooth areas of the glass end surface and black regions created by diffused reflection of light from the projections and recesses due to precipitations. Further, the sample image in FIG. 5A for Observation B shows a concave cross-sectional shape. In contrast, the sample images in FIG. 5B for Observations A show clear boundaries between the white regions and the black regions. Thus, it is considered that the samples shown in FIG. 5B achieve high etching accuracy.

Evaluation of Coefficient of Thermal Expansion and Glass Transition Temperature Tg:

The glass sample was processed into a circular cylinder 5 mm in diameter and 20 mm long, and the coefficient of thermal expansion and the glass transition temperature Tg were measured with a differential dilatometer (Thermo Plus2 TMA8310). The average thermal expansion coefficient in the temperature range of 100° C. to 300° C. was calculated from the results of measuring the thermal expansion coefficient.

Density:

The density was measured according to the Archimedean method.

Chemical Strengthening:

The glass sample, after being rinsed, was immersed for about 2.5 hours in a treatment bath containing 100% of $KNO_3$ kept at 400° C., to exchange the $Na^+$ ions on the superficial layer of the glass with $K^+$ ions present in the treatment bath and thereby chemically strengthen the glass sample. The chemically-strengthened glass substrate was immersed in a rinsing tank for rinsing and then dried, to thereby obtain a piece of strengthened glass. As for Samples 37, 40, 42, and 52, each glass sample was chemically strengthened by being immersed for about 5 hours in a treatment bath containing 100% of $KNO_3$ kept at 500° C.

Evaluation of Compressive-Stress Value and Thickness (Depth) of Compressive-Stress Layer:

The strengthened glass obtained as above was observed to find the number of interference fringes and the interval therebetween with a surface stress meter (FSM-6000LE from Orihara Industrial Co., Ltd.), and the compressive-stress value of the compressive-stress layer formed in the vicinity of the surface of the glass and the thickness (depth) of the compressive-stress layer were calculated. The value of the refractive index (nd) of each strengthened glass used for the calculation was measured with a refractometer (KPR-200 from Shimadzu Device Corporation). Note that the stress optical coefficient was regarded as 28 ((nm/cm)/MPa) in the calculation for the compressive-stress value.

Tables 11 and 12 show the evaluation results and other characteristics of Samples 34 to 62 of the second embodiment shown in Tables 7 and 8 and those of Samples 53 to 76 of the second embodiment shown in Tables 9 and 10.

TABLE 12

| | | Glass characteristics | | | | | |
|---|---|---|---|---|---|---|---|
| | | Tl (° C.) | Etching rate (μm/min) | Tg (° C.) | Avg. thermal expansion coef. [×$10^{-7}$/° C.] | Density (g/cm$^3$) | Processing accuracy |
| Sample | 63 | 858 | 2.3 | 563 | 90 | 2.51 | Poor |
| | 64 | 830 | 1.7 | 554 | 90 | 2.50 | Poor |
| | 65 | 855 | 3.4 | 576 | 90 | 2.51 | Poor |
| | 66 | 836 | 2.8 | 571 | 90 | 2.51 | Poor |
| | 67 | | 3.5 | 570 | | | Poor |
| | 68 | 1021 | 4.5 | 604 | 89 | 2.49 | Poor |
| | 69 | 948 | 5.2 | 593 | 95 | 2.52 | Poor |
| | 70 | 927 | 4.3 | 578 | 97 | 2.49 | Poor |
| | 71 | 988 | 5.3 | 592 | 97 | 2.49 | Poor |
| | 72 | 1003 | 5.2 | 616 | 90 | 2.54 | Poor |
| | 73 | 1018 | 6.1 | 626 | 91 | 2.53 | Poor |
| | 74 | 1003 | 6.1 | 614 | 91 | 2.53 | Poor |
| | 75 | 968 | 4.1 | 586 | 91 | 2.51 | Poor |
| | 76 | 1200 | 4.8 | 636 | 92 | | Poor |

A comparison between Tables 11 and 12 reveals that Samples 34 and 35 containing 2.6% or less of CaO and Samples 36 to 62 substantially containing no CaO have high processing accuracies in the etching of glass substrates. Note that the "processing accuracy" in Tables 11 and 12 shows evaluation results for when etching is performed on the end surfaces of glass substrates that have been machined, but even when etching is performed with the aim of shape-processing a glass substrate to provide it with the shape as illustrated in FIG. 1, the evaluation result on the processing accuracy thereof has the same tendency as the evaluation result for when etching is performed on the end surfaces of a glass substrate that has been machined. In other words, Samples 34 and 35 containing 2.6% or less of CaO and

TABLE 11

| | | Glass characteristics | | | | | | | |
|---|---|---|---|---|---|---|---|---|---|
| | | Tl (° C.) | Etching rate (μm/min) | Tg (° C.) | Avg. thermal expansion coef. [×$10^{-7}$/° C.] | Density (g/cm$^3$) | Compressive-stress value (MPa) | Surface compressive layer depth (μm) | Processing accuracy |
| Sample | 34 | 1000 | 5.1 | 610 | 89 | 2.46 | | | Fair |
| | 35 | 1112 | 5.2 | 620 | 91 | 2.50 | | | Fair |
| | 36 | 1090 | 3.7 | 585 | 99.7 | 2.455 | 693 | 47 | Good |
| | 37 | <840 | 4.0 | 559 | 106 | 2.480 | 543 | 57 | Good |
| | 38 | <840 | 4.6 | 579 | 97.9 | 2.510 | 684 | 53 | Good |
| | 39 | <840 | 3.7 | 511 | 114 | 2.477 | 147 | 88 | Good |
| | 40 | <840 | 4.2 | 527 | 113 | 2.506 | 236 | 83 | Good |
| | 41 | <840 | 4.1 | 572 | 106 | 2.502 | 587 | 66.8 | Good |
| | 42 | <840 | 3.7 | 551 | 102.7 | 2.460 | 354 | 53.4 | Good |
| | 43 | <840 | 3.8 | 574 | 99.5 | 2.457 | 524 | 47.7 | Good |
| | 44 | <840 | 3.7 | 566 | 102.7 | 2.453 | 576 | 49.4 | Good |
| | 45 | <840 | 4.2 | 570 | 105 | 2.449 | 584 | 65 | Good |
| | 46 | <840 | 3.9 | 581 | 102.6 | 2.487 | | | Good |
| | 47 | 907 | 4.2 | 574 | 104 | 2.459 | | | Good |
| | 48 | <840 | 4.5 | 572 | 103.6 | 2.463 | | | Good |
| | 49 | 953 | 5.2 | 577 | 105 | 2.465 | | | Good |
| | 50 | <840 | 3.9 | | | | | | Good |
| | 51 | <840 | 3.9 | | | | | | Good |
| | 52 | <840 | 4.0 | | | | | | Good |
| | 53 | <950 | 3.7 | 544 | 107 | 2.46 | 350 | 56 | Good |
| | 54 | <950 | 3.7 | 558 | 102 | 2.46 | 529 | 63 | Good |
| | 55 | <950 | 3.8 | 574 | 102 | 2.46 | 616 | 53 | Good |
| | 56 | <900 | 3.8 | 580 | 98 | 2.46 | 591 | 54 | Good |
| | 57 | <900 | 3.7 | 586 | 101 | 2.46 | 705 | 50 | Good |
| | 58 | 921 | 3.8 | 583 | 102 | 2.46 | 719 | 51 | Good |
| | 59 | <850 | 3.8 | 578 | 102 | 2.45 | 660 | 54 | Good |
| | 60 | 879 | 3.8 | 576 | 100 | 2.45 | 655 | 54 | Good |
| | 61 | 914 | 3.8 | 568 | 100 | 2.46 | 610 | 53 | Good |
| | 62 | <850 | 3.8 | 551 | 94 | 2.46 | 559 | 52 | Good |

Samples 36 to 62 substantially containing no CaO can be considered as having high processing accuracies even when etching is performed with the aim of shape-processing.

Figure 6:
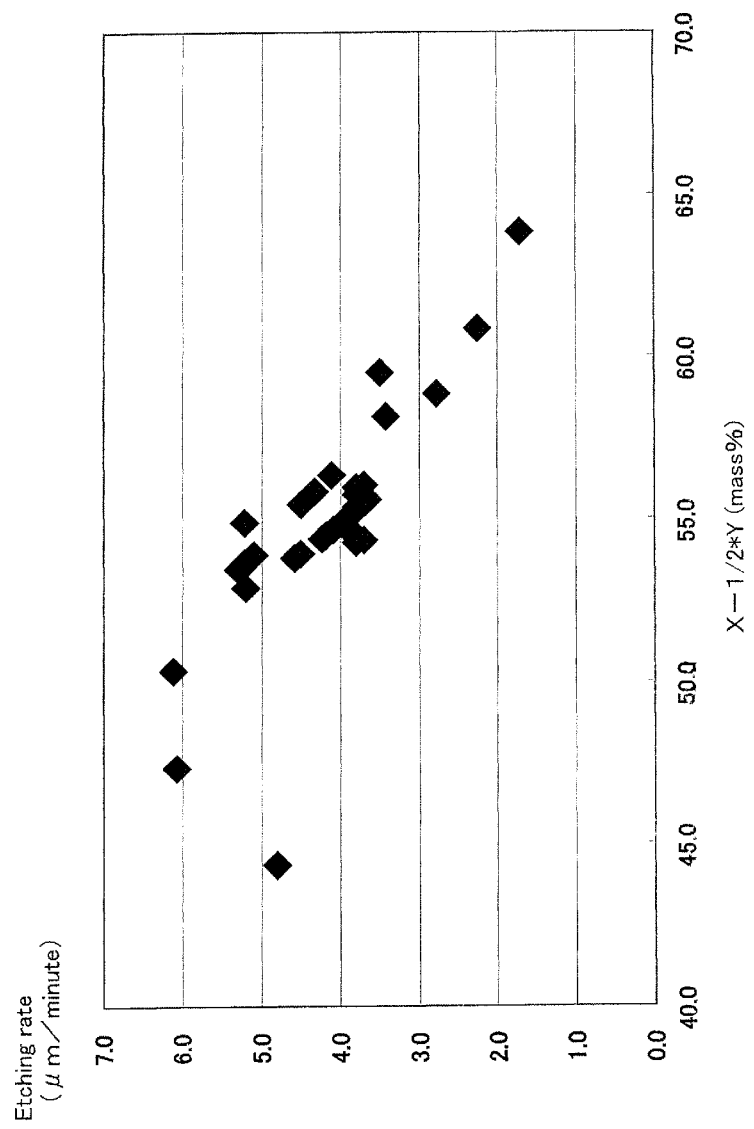
FIG. 6 is a chart illustrating the relationship between various glass compositions and etching rates according to the second embodiment.

FIG. 6 shows a distribution chart showing the etching rates given on Tables 11 and 12 on the Y-axis and the aforementioned X-½·Y (wherein X is the content by percentage of $SiO_2$ and Y is the content by percentage of $Al_2O_3$) on the X-axis for Samples 34 to 62 in Tables 7 and 8 and Samples 63 to 76 in Tables 9 and 10. As can be seen, the etching rate increases as the value of X-½·Y decreases. Meanwhile, no significant change in the etching rate can be seen in the area where X-½·Y is 52% or less. So, in order to achieve an etching rate of 3.7 μm/minute or greater, it is preferable that X-½·Y is 57.5% or less. However, even if the value of Y is increased and X-½·Y is adjusted to 52% or less, there will be no further increase in the etching rate, and in addition, the devitrification temperature will increase and thus the devitrification resistance will deteriorate. Therefore, the lower limit of the value of X-½·Y is preferably 45%.

Example of Continuous Production of Glass Substrate:

Glass materials were prepared so as to provide a glass substrate with the composition shown in Sample 36 (see Tables 7 and 8). The glass materials were molten at 1520° C. by using a continuous melting device having, for example, a fire-brick-made melting tank, a platinum-made stirring tank and so on, were subjected to refining at 1550° C., stirred at 1350° C., and then formed into a thin plate 0.7 mm thick by down-draw processing, to produce a glass substrate. Etching and chemical strengthening were performed as follows.

On each of the two principal surfaces of the glass substrate prepared as above, a 20-μm-thick pattern made of a phenolic heat-curable resin and having the shape of a cover glass was formed by mesh-screen printing, and the phenolic heat-curable resin patterns were baked for 15 minutes at 200° C. With the phenolic heat-curable resin patterns being employed as masks, the glass substrate was etched in the regions-to-be-etched from both principal surfaces by using a mixed-acid aqueous solution (40° C.) containing hydrofluoric acid (15% by mass) and sulfuric acid (24% by mass) as the etchant, to cut the glass substrate into a predetermined shape. Then, the phenolic heat-curable resin remaining on the glass surface was dissolved by using an NaOH solution and was removed off from the glass substrate, and then the substrate was rinsed.

Then, the rinsed glass substrate was immersed for about 5 hours in a treatment bath containing 100% of $KNO_3$ kept at 500° C., to exchange the Na ions on the superficial layer of the glass with K ions present in the treatment bath and thereby chemically strengthen the glass substrate. The chemically-strengthened glass substrate was immersed in a rinsing tank for rinsing and then dried.

The result was that it was possible to produce a cover glass having excellent accuracy in shape.

As described above, with the cover-glass production method and the cover glass of the first embodiment, the etching rate can be improved, and thus the cover-glass production efficiency can be improved. Further, with the cover-glass production method and the cover glass of the second embodiment, the cover glass can be produced with high accuracy in shape, even if the shape is complicated, and thus the cover-glass production efficiency can be improved.

Certain embodiments of the cover glass and the cover-glass production method of the present invention were described in detail above, but the present invention is not to be limited to the foregoing embodiments and can be modified and/or improved in various ways as far as such modifications/improvements do not depart from the gist of the present invention.

What is claimed is:

1. A cover glass comprising:
a plate-shaped glass substrate having a compressive-stress layer on principal surfaces thereof,
the glass substrate containing, as components thereof, 50% to 67% by mass of $SiO_2$, 5% to 20% by mass of $Al_2O_3$, 10% to 15.4% by mass of $Na_2O$, 0% to 1% by mass of $Li_2O$, 0% to less than 4% by mass of $K_2O$, substantially no CaO, 0% to less than 0.1% by mass of $ZrO_2$, 0% to 1% by mass of $TiO_2$, 0% to 5% by mass of $B_2O_3$, and greater than 1% to 15% by mass of MgO,
the ratio of the content of $K_2O$ to $R_2O$ ($K_2O/R_2O$) of the substrate being from 0 to 0.08, and
the ratio of the content of $ZrO_2$ and $TiO_2$ to $SiO_2$ (($ZrO_2$+$TiO_2$)/$SiO_2$) of the substrate being from 0 to 0.01, and
if the content by percentage of the $SiO_2$ is X % by mass and the content by percentage of the $Al_2O_3$ is Y % by mass, X-½·Y is 45% to 57.5% by mass.

2. The cover glass according to claim 1, wherein the compressive-stress layer is formed on an end surface of the cover glass.

3. The cover glass according to claim 1, wherein the glass substrate has an etching characteristic in which an etching rate is at least 3.7 μm/minute in an etching environment having a temperature of 22° C. and containing hydrogen fluoride with a concentration of 10% by mass.

4. The cover glass according to claim 1, wherein the glass substrate is formed into a plate-like shape by a down-drawing process.

5. The cover glass according to claim 1, wherein the glass substrate contains substantially no $K_2O$.

6. The cover glass according to claim 1, wherein the glass substrate has a strain point of 580° C. or more.

7. The cover glass according to claim 1, wherein the depth of the compressive stress layer range is 47.7 μm to 90.0 μm.

* * * * *